United States Patent
Scalisi et al.

(10) Patent No.: US 7,218,242 B2
(45) Date of Patent: May 15, 2007

(54) COMMUNICATION SYSTEM AND METHOD INCLUDING COMMUNICATION CHANNEL MOBILITY

(75) Inventors: Joseph F. Scalisi, Walnut, CA (US); Lawrence E. Hecox, Long Beach, CA (US)

(73) Assignee: Pocketfinder Inc., Yorba Linda, CA (US)

( * ) Notice: Subject to any disclaimer, the term of this patent is extended or adjusted under 35 U.S.C. 154(b) by 86 days.

(21) Appl. No.: 10/951,855

(22) Filed: Sep. 27, 2004

(65) Prior Publication Data

US 2005/0070250 A1 Mar. 31, 2005

Related U.S. Application Data

(63) Continuation of application No. 09/499,058, filed on Feb. 4, 2000, now Pat. No. 6,879,244, which is a continuation-in-part of application No. 08/859,904, filed on May 21, 1997, now abandoned.

(51) Int. Cl.
*H04L 1/00* (2006.01)
*H04Q 1/30* (2006.01)

(52) U.S. Cl. ............................. 340/825.01; 340/7.2

(58) Field of Classification Search ............ 340/7.21, 340/23, 7.3, 42, 7.57, 62, 7.53; 370/329, 370/338; 379/114.2, 189, 211.02, 88.01, 379/26; 455/405, 406, 410, 411, 413, 416, 455/426.1, 2, 447, 461, 556.1, 561

See application file for complete search history.

(56) References Cited

U.S. PATENT DOCUMENTS

| | | | |
|---|---|---|---|
| 4,682,351 A | 7/1987 | Makino | |
| 4,724,537 A | 2/1988 | Monet | |
| 4,747,122 A | 5/1988 | Bhagat et al. | |
| 4,908,848 A | 3/1990 | Hanawa | |
| 5,003,576 A | 3/1991 | Helferich | |
| 5,117,449 A | 5/1992 | Metroka et al. | |
| 5,148,473 A | 9/1992 | Freeland et al. | |
| 5,151,929 A | 9/1992 | Wolf | |
| 5,203,009 A | 4/1993 | Bogusz et al. | |
| 5,303,297 A | 4/1994 | Hillis | |

(Continued)

FOREIGN PATENT DOCUMENTS

WO    WO 88/06830    9/1988

(Continued)

*Primary Examiner*—Wendy R. Garber
*Assistant Examiner*—William Bangachon
(74) *Attorney, Agent, or Firm*—Gazdzinski & Associates

(57) ABSTRACT

A system and method for a communication apparatus to provide advanced features such as communication channel mobility, billing options for communication charges (for instance reverse billing), and definable accessibility controls. A subscriber apparatus (for instance a wireless communication apparatus) includes pager (such as a page phone) or radiotelephone functions. A caller calls the subscriber apparatus. The caller gains two-way communication with the subscriber apparatus. The subscriber apparatus may include a radio frequency power level monitor to control movement of a communication channel of the subscriber apparatus from a first communication system (for instance a regular cellular system) to a second communication system (for instance a local loop). The billing options include reversing communication charges (for instance from a subscriber to a calling party), listening to advertisements to reduce communication charges, or splitting communication charges (for instance between a subscriber and a calling party).

52 Claims, 15 Drawing Sheets

U.S. PATENT DOCUMENTS

| | | | |
|---|---|---|---|
| 5,325,418 A | 6/1994 | McGregor et al. | |
| 5,365,570 A | 11/1994 | Boubelik | |
| 5,392,452 A | 2/1995 | Davis | |
| 5,418,835 A | 5/1995 | Frohman et al. | |
| 5,425,083 A | 6/1995 | Furuya et al. | |
| 5,473,671 A | 12/1995 | Partridge, III | |
| 5,479,482 A | 12/1995 | Grimes | |
| 5,487,108 A | 1/1996 | Atkins et al. | |
| 5,491,739 A | 2/1996 | Wadin et al. | |
| 5,495,517 A | 2/1996 | Ide et al. | |
| 5,511,111 A | 4/1996 | Serbetcioglu et al. | |
| 5,559,866 A * | 9/1996 | O'Neill | 455/447 |
| 5,574,771 A | 11/1996 | Driessen et al. | |
| 5,574,772 A | 11/1996 | Scalisi | |
| 5,581,594 A | 12/1996 | McAfee | |
| 5,602,907 A | 2/1997 | Hata et al. | |
| 5,625,884 A | 4/1997 | Gitlin et al. | |
| 5,644,626 A * | 7/1997 | Carlsen et al. | 340/7.21 |
| 5,701,337 A | 12/1997 | Silver et al. | |
| 5,737,707 A | 4/1998 | Gaulke et al. | |
| 5,749,052 A | 5/1998 | Hidem et al. | |
| 5,835,856 A | 11/1998 | Patel | |
| 6,226,495 B1 | 5/2001 | Neustein | |
| 6,418,316 B2 * | 7/2002 | Hildebrand et al. | 455/447 |
| 6,522,879 B2 | 2/2003 | Myer et al. | |
| 6,879,244 B1 * | 4/2005 | Scalisi | 340/7.2 |

FOREIGN PATENT DOCUMENTS

| | | |
|---|---|---|
| WO | WO 92/14330 | 8/1992 |

* cited by examiner

COMMUNICATION SYSTEM AND METHOD INCLUDING COMMUNICATION CHANNEL MOBILITY

CROSS-REFERENCE TO RELATED APPLICATIONS

This application is a continuation of prior application Ser. No. 09/499,058, filed Feb. 4, 2000, entitled "Call Receiving System Apparatus and Method Having a Dedicated Switch," now U.S. Pat. No. 6,879,244, which is a continuation-in-part application of a Continued Prosecution Application based on U.S. patent application Ser. No. 08/859,904, filed May 21, 1997, now abandoned. This application is also related to U.S. Pat. No. 5,574,772 entitled "Personal Apparatus for Receiving Radiotelephone Communications".

FIELD OF THE INVENTION

The present invention relates generally to a apparatus, system, and method utilizing two-way wireless communication that can be initiated by, and billed to, a caller. The apparatus and method utilizes paging signals or cellular signals to create a two-way wireless communication connection between an outside caller and a pagephone/call receiving pager apparatus user/subscriber. More particularly, the present invention is directed to a apparatus, system and method which utilizes a subscriber apparatus capable of receiving pager signals or cellular signals to generate a two-way wireless communication by an outside caller calling a subscriber's page number wherein the caller is billed for the communication time and the subscriber is unable to incur communication charges due to their inability to initiate, in one embodiment, a direct two-way wireless communication with the apparatus. Further, although the subscriber maybe unable to initiate a direct two-way wireless communication using the apparatus, the system and method of the present invention may include the ability to split the cost, or a portion of the cost, for any given call between the subscriber and the caller.

The present invention is also directed to a call receiving pager system, method and apparatus having call back request features. The call back request features comprise a switching means located on the apparatus that is capable of sending a prerecorded voice or data message from the subscriber apparatus to an emergency telephone number such as "911" and/or a pre-determined telephone number which are stored within the device. The pre-recorded voice or data message which is sent to these stored numbers requests that the party receiving the pre-recorded voice or data message initiate contact with the subscriber by calling the subscriber's page number. Paging the subscriber initiates two-way wireless communication which can be carried out when the subscriber answers the call being made to the subscriber apparatus.

The predetermined telephone number may be a call center telephone number. In this case, a subscriber receiving a call back from the call center may incur an airtime charge which can be charged on a pre-paid basis using a credit card. Once the subscriber answers the call back from the call center operator, the subscriber may request connection by the operator to a specific number wherein the operator makes the connection on a collect call basis.

BACKGROUND OF THE INVENTION

Mobile radio communication is well known in the art. Cellular radio has spawned Personal Communication Service (PCS). PCS is wireless and the user requires no tether such as the wire pair that connects a conventional telephone to a local serving switch. Cellular radio with a hand held terminal, i.e. hand held cellular telephones, gives the user tetherless telephone communication. Further, paging systems provide the mobile and ambulatory user with a means of being alerted that someone wishes to contact or talk to that person. The cordless telephone is yet another example of a tetherless personal communication device.

The public switched telecommunications network (PSTN) is vast and includes hundreds of national networks that are interconnected to form a gigantic international network. Cellular service is an adjunct to the network. Cellular radio systems provide two-way signaling and communication by usually connecting a mobile terminal to another user through the PSTN where the other user is most commonly a subscriber of the PSTN. Nevertheless, the other user may be a mobile terminal. Most of the connectivity involves connecting wired telephone service to mobile users. The mobile telephone switching office (MTSO) is the heart of a cellular system for a specific serving area. The MTSO is connected to the PSTN by a trunk group. Trunks are the telephone lines connecting one telephone switch or exchange with another.

In contrast, paging is a one-way radio alerting system that is a simple extension of the PTSN. Unlike cellular radio systems, the direction of transmission is from a fixed paging transmitter to an individual. Some pagers have digital readouts which provide the individual with a number to call back while others give a short message or enable a transmitter to leave a voice mail by hooking into a voice mail system.

Technology in recent years has resulted in a vast number of cordless telephones, cellular telephones and paging apparatus which exhibit a variety of unique and multiple features. For example, the following described inventions are directed to cellular telephones. U.S. Pat. No. 4,908,848 issued to Hanawa discloses an apparatus for a mobile communication system having a handset which can be programmed to lock calls, restrict calls, or time calls. U.S. Pat. No. 5,203,009 issued to Bogusz et al. describes a cellular telephone having a fixed calling capacity which limits the use of the phone by only enabling it to call emergency telephone numbers. A similar cellular telephone is described in U.S. Pat. No. 5,365,570 issued to Boubelik which discloses an emergency radio telephone apparatus having a housing, a radio transceiver for receiving and transmitting modulated radio signals, and an actuator connected to the housing for actuating the transceiver and initiating the process of connecting to a predetermined emergency phone number. U.S. Pat. No. 4,845,772 issued to Metroka et al. describes a portable radiotelephone with control switch disabling having a keypad covered by a movable element which produces an on-hook condition when the movable element is in a first position covering the keypad, and an off-hook condition when the movable element is in a second position exposing the keypad.

Numerous paging systems having various functions and capabilities are also well known in the prior art. For example, U.S. Pat. No. 4,906,989 issued to Kasugai describes a paging system having a vehicle mounted repeater with a portable paging receiver detachably mounted on the repeater. Also, U.S. Pat. No. 4,940,963 issued to Gutman et al. discloses a paging system having a centrally located terminal and a plurality of remote pager units wherein both automatic and manual acknowledge back signaling is provided.

The prior art also includes combined radiotelephone and paging systems as evidenced by the following: i) U.S. Pat. No. 5,040,204 issued to Sasaki et al. discloses a cordless telephone apparatus with a removably mounted pager which reports an incoming signal from a parent device or radiotelephone; ii) U.S. Pat. No. 4,747,122 issued to Bhagat et al. describes a mobile paging call back system which includes a control unit interconnecting a radio pager, a memory, an indicator, a control switch, and an automatic dialer with the control unit including a logic circuit that is programmed to verify valid telephone number information received from a pager, to store the verified data in memory, to activate the indicator to show that valid data has been received and to transfer the stored data to the automatic dialer to reach a mobile radiotelephone; iii) U.S. Pat. No. 5,117,449 issued to Metroka et al. discloses an integrated paging and radiotelephone apparatus which combines paging and cellular radiotelephone functions in a single unit having dual receivers thereby allowing reception of paging signals simultaneously with cellular radiotelephone signals; and iv) U.S. Pat. No. 5,148,473 issued to Freeland et al. which describes an apparatus combining a radio pager and a cellular radiotelephone into one unit which may automatically receive a plurality of pages while the cellular radiotelephone is on and communicating a cellular telephone call, or off or unattended.

Although combined radiotelephone and paging systems have been described, none of those systems prevents initiation of a direct two-way wireless communication by the subscriber or holder of the dual paging/radiotelephone system, nor do any of those combined systems described above include a system wherein only the outside calling party pays for the telecommunication when the caller and subscriber are activated. Either one or both of these features would drastically reduce fraudulent use of the wireless two-way communication system. Further, implementation of either or both of these features would enable a subscriber to exert optimum control over costs.

Accordingly, there is a need for a call receiving pager apparatus, system and method utilizing a dedicated switch which allow for incoming calls but prevent direct outgoing calls in order to control costs and fraudulent use of the system. This is particularly useful in those situations where companies would like to enable their employees to have direct real-time wireless two-way communication with one another in order to facilitate job efficiency. For example, individual employees such as sales persons, drivers and delivery personnel, real estate agents, and hospital personnel could be equipped with the present invention in order to communicate with others within or outside of their organization either out in the field or within a large facility that houses the employees. There is also a need for such a call receiving pager apparatus, system and method utilizing a dedicated switch where the calling party is billed for the call so that a pager number is not given out to numerous individuals by the person carrying the apparatus thereby enabling anyone to run up telephone toll charges associated with use of the apparatus during two-way communication.

Parents are another target market for this call receiving pager apparatus, system and method utilizing a dedicated switch in that it would enable children to be directly connected to their parents upon being paged by their parents without the expense of cellular telephone charges. Such an apparatus, system and method will prevent the accumulation of billings associated with frivolous or unnecessary calls made by children in that the apparatus, system and method do not allow those possessing the apparatus to make direct outgoing calls. Further, if the apparatus were stolen, it would be impossible to commit further fraud by charging the subscriber of the apparatus for calls because the apparatus, system and method employ caller generated billing.

Finally, there is a need for a call receiving pager apparatus, system and method utilizing a dedicated switch which provide a subscriber of the apparatus with an ability to contact a predetermined number or call center number without enabling the subscriber to initiate direct two-way wireless communication with the predetermined number or call center number thereby keeping the fraud and cost control functions of the system, method and apparatus intact. This is achieved by enabling the method, system and apparatus to send a pre-recorded voice or data message from the subscriber apparatus to a pre-determined telephone number such as an emergency number, e.g. "911", a home telephone number, an office or business number, or a call center number. Upon connection with the pre-determined number or call center number, the transmitted prerecorded voice or data message informs the receiver of the call as to the subscriber's name and the subscriber's page number. The pre-recorded voice or data message may also include a brief message from the subscriber and then instructs the receiver to page/call the subscriber in order to initiate two-way wireless communication with the subscriber.

SUMMARY OF THE INVENTION

In one aspect of the present invention, a wireless local loop system is disclosed. The wireless local loop system includes a local exchange carrier and a low power omnidirectional radio frequency transceiver. In one embodiment, a low power omnidirectional radio frequency transceiver is adapted to communicate with the local exchange carrier to facilitate a local exchange carrier's establishment of a local loop over an area via the low power omnidirectional radio frequency transceiver. In this embodiment, at least one wireless communication apparatus (for instance a pagephone) may have a mobile identification number associated therewith.

Furthermore, the at least one wireless communication apparatus may further have a dual mode transceiver configured to provide automatic roaming capability from the local loop to a regular cellular system. In addition, the at least one wireless communication apparatus may include a radio frequency power level monitor. The radio frequency power level monitor is adapted to determine movement of the at least one wireless communication apparatus between the local loop and a regular cellular system. The radio power level monitor may also initiate de-registration and registration of the at least one wireless communication apparatus from one of the local loop or the regular cellular system to one of the local loop or the regular cellular system.

The apparatus may further be configured to receive and process the mobile identification number such that a wireless connection can be made between a telephone apparatus initiating a call to the at least one pagephone, thereby allowing two-way communication to be established between the telephone apparatus initiating the call and the at least one pagephone.

The system may further comprise charging at least a portion of the call to an account associated with the telephone apparatus initiating the call.

In one alternative embodiment, the radio frequency power level monitor may be adapted to provide a deference of registration of the at least one pagephone with the local loop from the regular cellular system. In this alternative embodiment, the deference of registration may occur when a detected power level of a radio frequency signal having a frequency associated with the local loop is detected above a predefined power level.

In yet another embodiment, a wireless local loop apparatus is disclosed. The apparatus comprises a radio frequency transceiver. The radio frequency transceiver is configured to communicate with a local exchange carrier and at least one wireless communication apparatus (for instance a pagephone). In this embodiment, the local exchange carrier is configured to facilitate a local exchange carrier's capability to establish a local loop over an area via the radio frequency transceiver. In this same embodiment, the at least one wireless communication apparatus comprises an associated mobile number, and a multi-mode transceiver that provides automatic roaming from the local loop to a regular cellular system. The at least one wireless communication apparatus may further comprise a radio frequency power level monitor.

In one aspect, the radio frequency power level monitor is configured to determine movement of the at least one wireless communication apparatus between the local loop and the regular cellular system. In yet another aspect, the radio frequency power level monitor may be further configured to initiate de-registration and registration of the at least one wireless communication apparatus. The de-registration and registration of the at least one wireless communication apparatus, in one exemplary embodiment, occurs from one of the local loop or the regular cellular system to one of the local loop or the regular cellular system.

In another embodiment, the wireless local loop apparatus is adapted to receive and process the associated mobile number such that a wireless connection is made between a telephone apparatus initiating a call to the at least one wireless communication apparatus. Thereby, the radio frequency transceiver may allow two-way communication to be established between the telephone apparatus initiating the call and the at least one wireless communication apparatus.

In one alternative embodiment, the radio frequency power level monitor is adapted to provide a deference of registration of the at least one wireless communication apparatus with said local loop from the regular cellular system. The deference of registration, in one example, may occur when a detected power level of a radio frequency signal having a frequency associated with the local loop is detected above a predefined power level.

The objects and features of the present invention are set forth with particularity in the appended claims. The present invention, both as to its organization and manner of operation, together with further objects and advantages, may best be understood by reference to the following description, taken in connection with the accompanying drawings wherein like numerals denote like elements.

DETAILED DESCRIPTION OF THE PREFERRED EMBODIMENT

Figure 1A:
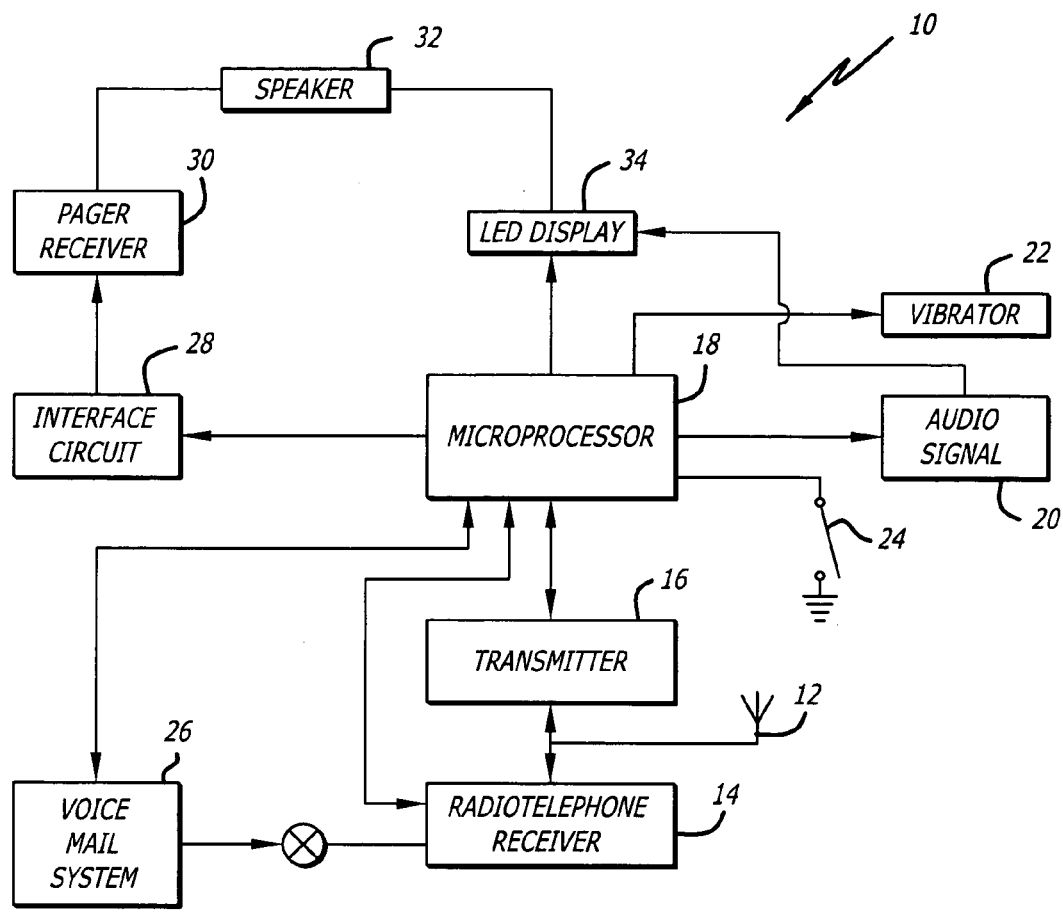
FIG. 1A shows a block diagram of a first preferred embodiment of the electronic circuitry of an apparatus for use with the personal communication system and method of the present invention which employs two-way wireless communication that can only be initiated by, and billed to, the caller.

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the systems, methods, and apparatus described herein are merely exemplary applications for the invention. Further, it should be noted that the present invention may employ any number of conventional techniques for data transmission, signaling, data processing, network control, and the like. Such general techniques that may be known to those skilled in the art are not described in detail herein.

It should be appreciated that the particular implementations shown and described herein are illustrative of the invention and its best mode and are not intended to otherwise limit the scope of the present invention in any way. Indeed, for the sake of brevity, conventional signal processing, data transmission, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved and simplified system for interfacing with a telephone or similar communications system, in any selected location, for enabling a caller to contact a user of an apparatus combining paging functions and radiotelephone functions (hereinafter referred to as a "pagephone" or a "call receiving pager apparatus") by radiotelephone.

By way of example, and not by way of limitation, set forth below is a description of a preferred embodiment of the simplified system, method and apparatus for carrying out the system of the present invention which is directed to a two-way wireless communication system with one way initiation by a caller and caller generated billing.

Turning now to the drawings, a block diagram 10 of one example of an electronic circuitry of an apparatus for use with the personal communication system of the present invention which employs two-way wireless communication that can only be initiated by, and billed to, the caller is shown in FIG. 1. The antenna 12 is used to receive and transmit radiotelephone signals to and from separate receiving circuit 14 and a transmitter circuit 16. The receiving and transmitting circuits 12 and 14 may be assembled using components and methods well known in the art. Both the receiving and transmitting circuits 12 and 14 are coupled to a microprocessor 18. When a signal is received from an outside caller having the correct mobile identification (M.I.D.) number of the pagephone, the microprocessor 18 will activate an alert signal such as an audio signal 20 or vibrator 22. If the pagephone is then fully opened (i.e. a flip element is moved into the open position such as with a flip phone), and not in use, a further switch means is activated in the pagephone. Activation of the further switch means enables the microprocessor to activate the radiotelephone transmitter 16 so that the pagephone will receive incoming signals and transmit outgoing signals to thereby allow a conversation to take place between the caller and the user of the unit. It is also contemplated that a caller identification system may be incorporated into the method and apparatus of the present invention to allow a user of the apparatus to determine who is paging that user before the user answers the page and connects with the caller.

The apparatus for use with the electronic circuitry preferably comprises a transmitting means that is only capable of transmitting radiotelephone signals that are associated with the signals received from the pagephone. The system may also include an optional voice mail means 26 which is later described with reference to FIGS. 6 and 7. The system may further include an interface circuit 28 which is coupled to the microprocessor 18 which sends verbal voice mail message left by callers to a pager receiver 30. The pager receiver 30 transmits the voice mail messages to a speaker 32 which enables the pagephone user to hear their voice mail messages without accessing a telephone to retrieve their messages. The speaker 32 may also be coupled to a liquid crystal display (LCD) 34 which can show the number of the message, the time the message was left, and the telephone number of the caller. If the pagephone is in use during the transmission of another call to the pagephone, the voice mail message system may be triggered automatically to replay stored messages upon closing the flip element of the page phone. Upon closing the flip element, the pagephone either visibly or audibly indicates that voice mail messages have been stored. The user then opens the flip element to retrieve and listen to the voice mail messages. In addition, the pagephone apparatus may utilize voice mail messaging means external to the pagephone apparatus which can be accessed by a pagephone subscriber by using any type of direct dial out telephone. (See, e.g., FIGS. 14–16 and their accompanying descriptions which describe the voice mail as being stored in an outside dedicated switch.

Other radiotelephone transceiving apparatus that may be successfully used in conjunction with the caller initiated and billed personal communication system of the present invention are disclosed and described in detail in U.S. Pat. No. 5,574,772 which is directed to a personal apparatus for receiving radiotelephone communications and is herein incorporated by reference.

Figure 1B:
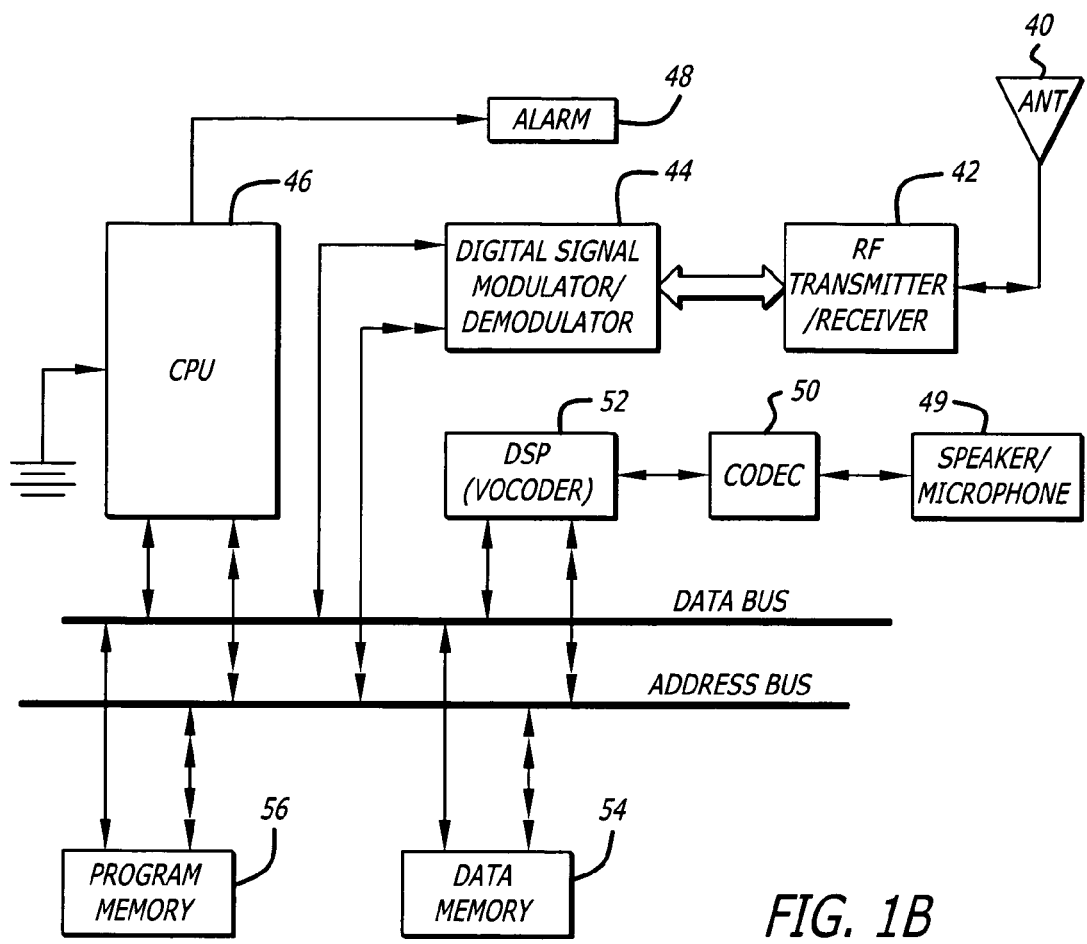
FIG. 1B shows a block diagram of a second preferred embodiment of the electronic circuitry of an apparatus for use with the personal communication system and method of the present invention which employs two-way wireless communication that can only be initiated by, and billed to, the caller.

A second preferred embodiment of the hardware comprising the electronic circuitry of an apparatus for use with the personal communication system of the present invention which employs two-way wireless communication that can only be initiated by, and billed to, the caller is shown in FIG. 1B. The major components shown are comparable to those found in most makes of wireless mobile phones.

The antenna 40 is used to receive and transmit radiotelephone signals to and from the radio frequency transmitter/ receiver 42. The radio frequency transmitter/receiver 42 converts the radio frequency analog into digital when a signal is received and converts the digital to analogue when a signal is transmitted from the radio frequency transmitter/receiver 42. The digital signal modulator/demodulator 44 is responsible for the generation of the radio frequency signal which is transmitted to the MTSO when the pagephone has been activated upon receipt of a signal. Current state of the art microchips for phones include this functioning for either time division multiple access (TDMA) digital techniques or code division multiple access (CDMA) digital techniques. The system, method and apparatus of the present invention can be used with these and any other wireless protocols currently available or which may later become available.

The digital signal modulator/demodulator 44 is connected to the central processor unit (CPU) 46 through the data bus and address bus. The CPU 46 is responsible for handling the protocols needed for processing a call and other call related functions such as the voice mail system. Upon receipt of a signal indicating the receiving of an outside call from the MTSO, the CPU 46 will activate an alert or alarm 48 in the form of an audio signal or vibration. A speaker/microphone 49 is coupled to the Codec 50 which is used to convert the voice data from analog to digital and digital to analog. Once the voice data is converted, the DSP (Vocoder) 52 is used to compress the output of Codec 50 in order to reduce the bandwidth of the voice data. Data may be stored in the data memory 54 and additional programmable functions may be stored in the program memory 56 until accessed.

Figure 3:
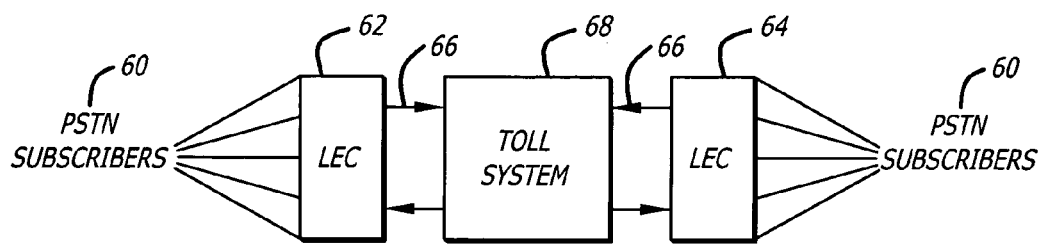
FIG. 3 is a schematic showing the conceptual layout of the public switched telecommunications network.
Figure 2:
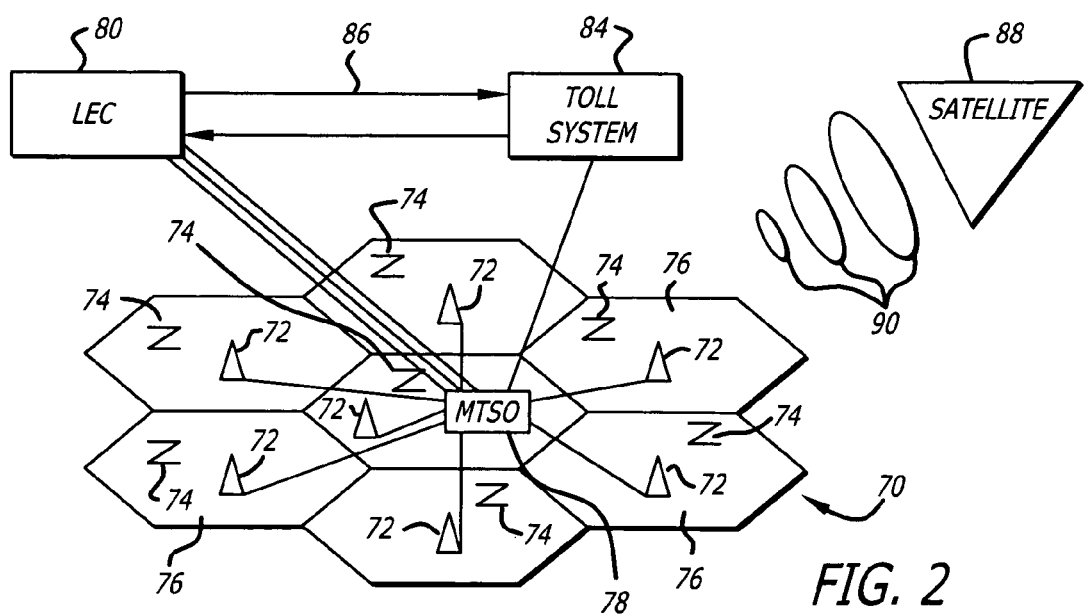
FIG. 2 is a schematic illustrating the conceptual layout of a wireless system and its relation to the public switched telecommunications network.

FIG. 2 shows a schematic illustration of the wireless system layout and its relation to the public switched telecommunications network while FIG. 3 shows a schematic of the public switched telecommunications network. In FIG. 3, there are numerous individual subscribers 60 that subscribe to the PSTN and these subscribers are linked to local exchange carriers (LEC) 62,64 and are interconnected by trunks. Toll connecting trunks 66 connect the local network 62,64 to the toll network 68. FIG. 2 shows the mobile telephone switching office (MTSO) as the heart of the wireless system for a specific serving area. The conventional wireless telecommunications switched network 70 is a network consisting of a plurality of wireless antennae 72 capable of receiving wireless band radio frequency signals 74, with each of the plurality of wireless antennae 72 being associated with a discrete cell site 76. The plurality of antennae 72 represent mobile units. The mobile units may be hand held or vehicle mounted terminals. Each of the plurality of wireless antennae 72 is electrically linked to a wireless switch 78 (the MTSO) which governs the operation of the wireless telecommunications switched network 70 and links the network 70 to a local exchange carrier 80 via T1 land lines 82. As previously described with reference to FIG. 2, the local exchange carrier 80 is connected to the toll network 84 via connecting trunks 86. Satellite means 88 may also be used to access the MTSO 78 via satellite signals 90. The MTSO 78 can then access the toll system 84 as previously described.

Figure 4:
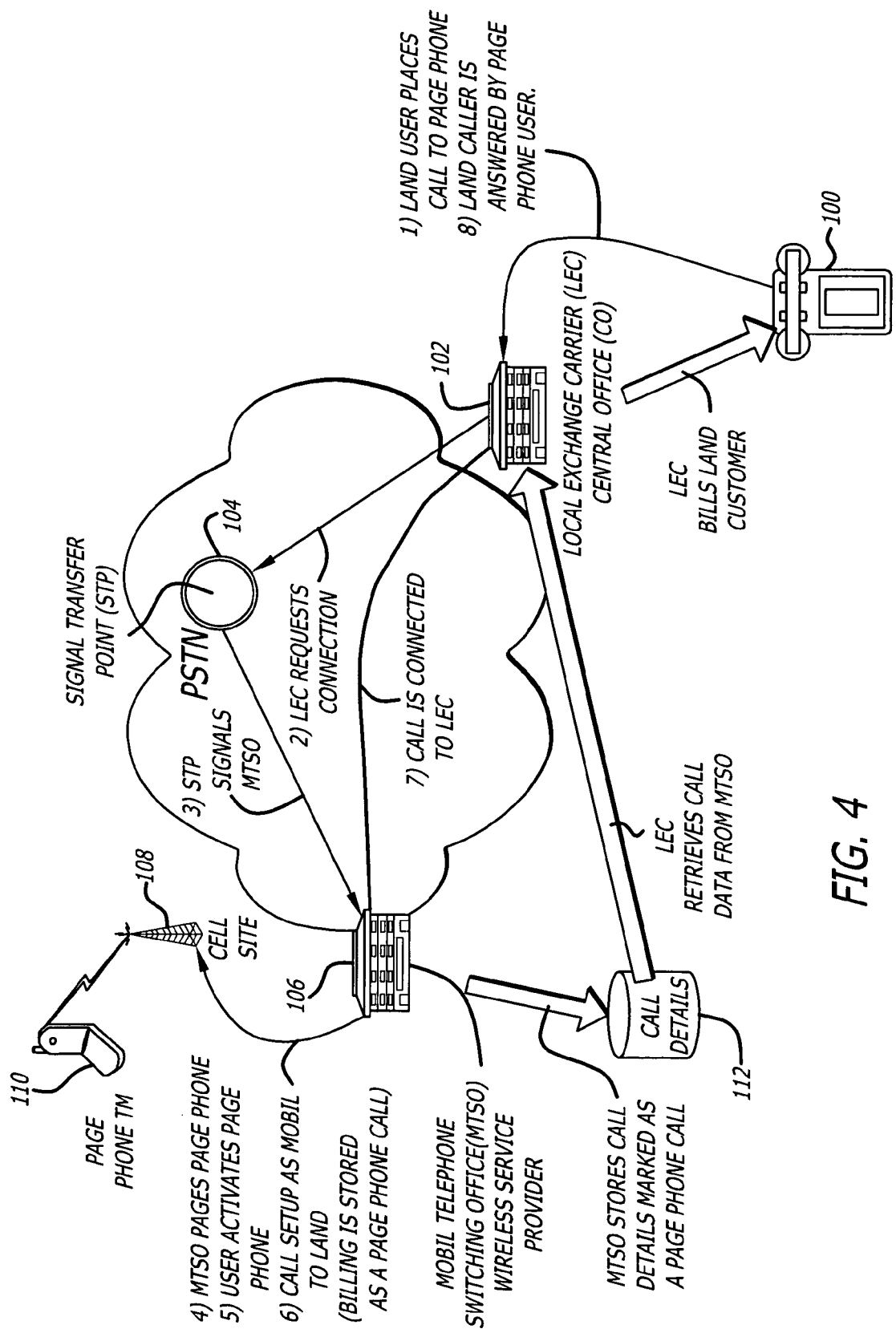
FIG. 4 is a schematic depicting a two-way wireless communication system that establishes instant two-way wireless communication between a public switched telecommunications network caller and a pagephone subscriber in accordance with the present invention.

A schematic depicting a two-way wireless communication system establishing two-way wireless communication between a public switched telecommunications network caller and a pagephone subscriber, including caller generated billing, in accordance with the present invention is shown in FIG. 4. A PSTN land caller 100 initiates a telephone call by dialing a pagephone number. The pagephone number is transmitted to the Local Exchange Carrier (LEC) 102. The LEC 102 sends a signal to the Signal Transfer Point (STP) 104 requesting connection and the STP 104 signals the Mobile Telephone Switching Office (MISO) 106 wireless service provider. The MTSO 106 pages the pagephone via a cell site 108 of the MTSO 106 and the pagephone subscriber activates the pagephone 110 upon being alerted to the page by an audio tone or vibration emanating from the pagephone 100. Activating the pagephone 110 may constitute a simple action such as flipping open a cover element on the pagephone 110 or depressing an activation button. The call is then set up as a mobile to land call and billing is stored as a pagephone call. Once the pagephone 110 is activated, the MTSO 106 sends a signal and the call is connected to the LEC 102 so that the land caller 100 is answered by the pagephone user or subscriber.

Referring now to the caller generated billing aspect of the invention, it was previously mentioned that the MTSO 106 stores the details of the call, i.e. the call details 112, to the pagephone 118 as a pagephone call. The LEC 102 then retrieves the call details from the MTSO 106 and the LEC 102 bills the land caller 100. Alternatively, the system of the present invention may be set up to generate split billing such that the subscriber pays a set portion, or a predetermined percentage, of the call and the land caller pays for the remaining portion of the call.

Figure 5:
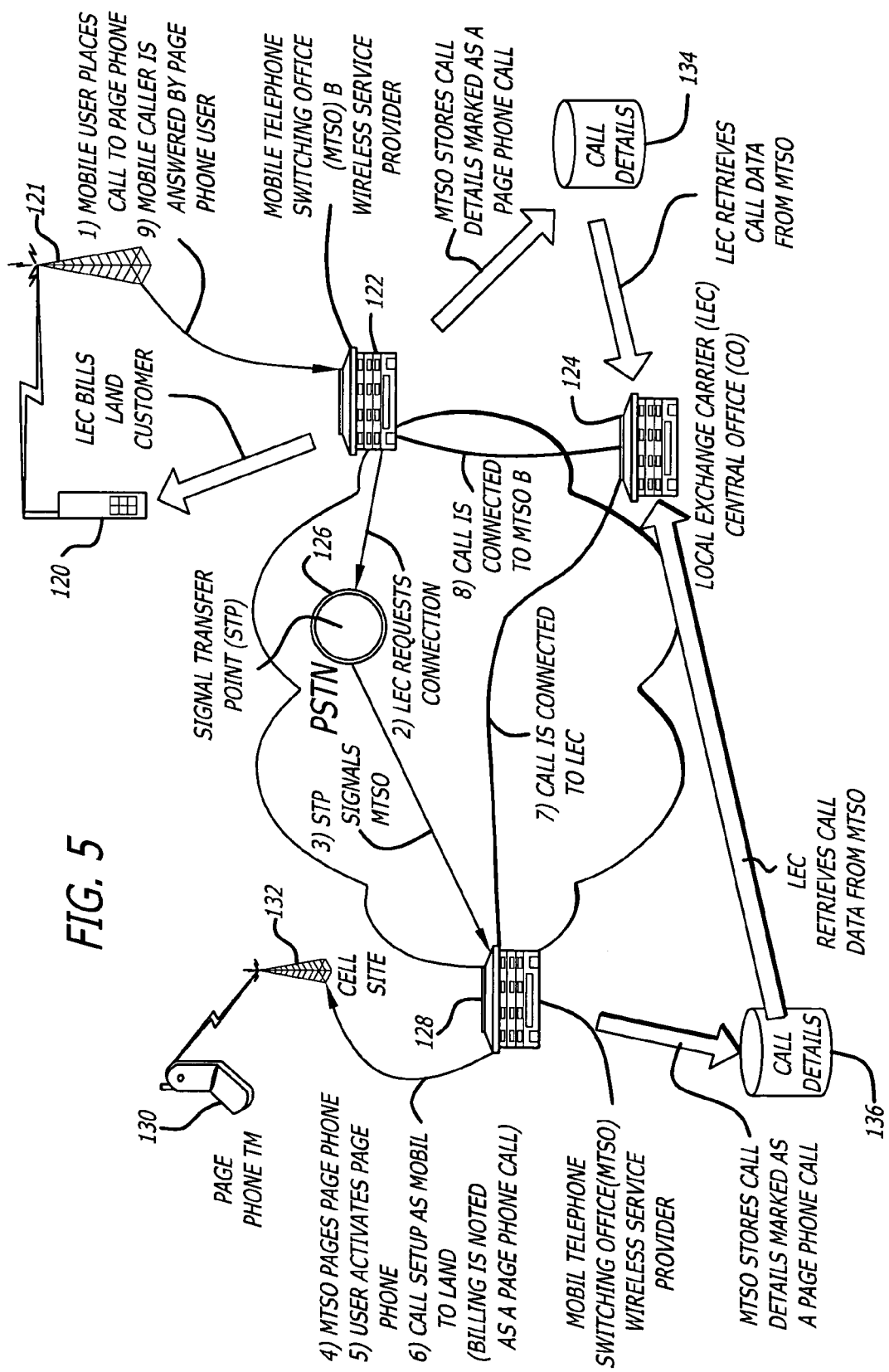
FIG. 5 is a schematic depicting a two-way wireless communication system that establishes instant two-way wireless communication between a wireless radiotelephone caller and a pagephone subscriber in accordance with the present invention.

A wireless telephone may also be used to initiate a call to the pagephone which is used with the two-way wireless communication system of the present invention. FIG. 5 is a schematic depicting a two-way wireless communication system that establishes calling party pays two-way wireless communication between a wireless radiotelephone caller and a pagephone subscriber in accordance with the present invention. The wireless (mobile) caller 120 initiates a telephone call by dialing a pagephone number. The call is received by a cell site 121 of the MTSO (B) 122, which is the mobile telephone switching office wireless service provider for the wireless (mobile) caller. The MTSO (B) transmits the signal to the local exchange carrier (LEC) 124 and the LEC 124 requests connection by sending a signal to the signal transfer point (STP) 126.

The STP 126 then signals the MTSO (A) 128 which is the mobile telephone switching office wireless service provider for the pagephone subscriber. The MTSO (A) 128 pages the pagephone 130 via a cell site 132 of the MTSO (A) 128 and the pagephone subscriber activates the pagephone 130 upon being alerted to the page by an audio tone or vibration emanating from the pagephone 130. Activating the pagephone 130 may constitute a simple action such as flipping open a cover element on the pagephone 130 or depressing an activation button. The call is then set up as a mobile to land call and billing is stored as a pagephone call. Once the pagephone 130 is activated, the MTSO (A) 128 sends a signal and the call is connected to the LEC 124. The LEC 124 sends a signal to the MTSO (B) 122 and upon the MTSO (B) receiving the signal, the call is connected to the MTSO (B) so that the wireless (mobile) caller 120 is answered by the pagephone user or subscriber.

Billing of the wireless caller 120 may occur in one of two ways. First, the MTSO (B) 122 of the wireless service provider for the wireless caller 120 may store the call details 134 of the call made to the pagephone as a pagephone call and the LEC 124 may retrieve the call data 134 from the MTSO (B) 122 and bill the wireless caller 120 through their wireless service provider. Second, the MTSO (A) 128 of the wireless service provider for the pagephone subscriber may store the call details 136 of the pagephone call. The LEC 124 can then retrieve the call data from the MTSO (B) and bill the wireless caller 120 through their wireless service provider. Alternatively, the system of the present invention may be set up to generate split billing between the subscriber and the caller such that the subscriber pays a set portion, or predetermined percentage, of the call and the wireless caller pays for the remaining portion of the call.

Figure 6:
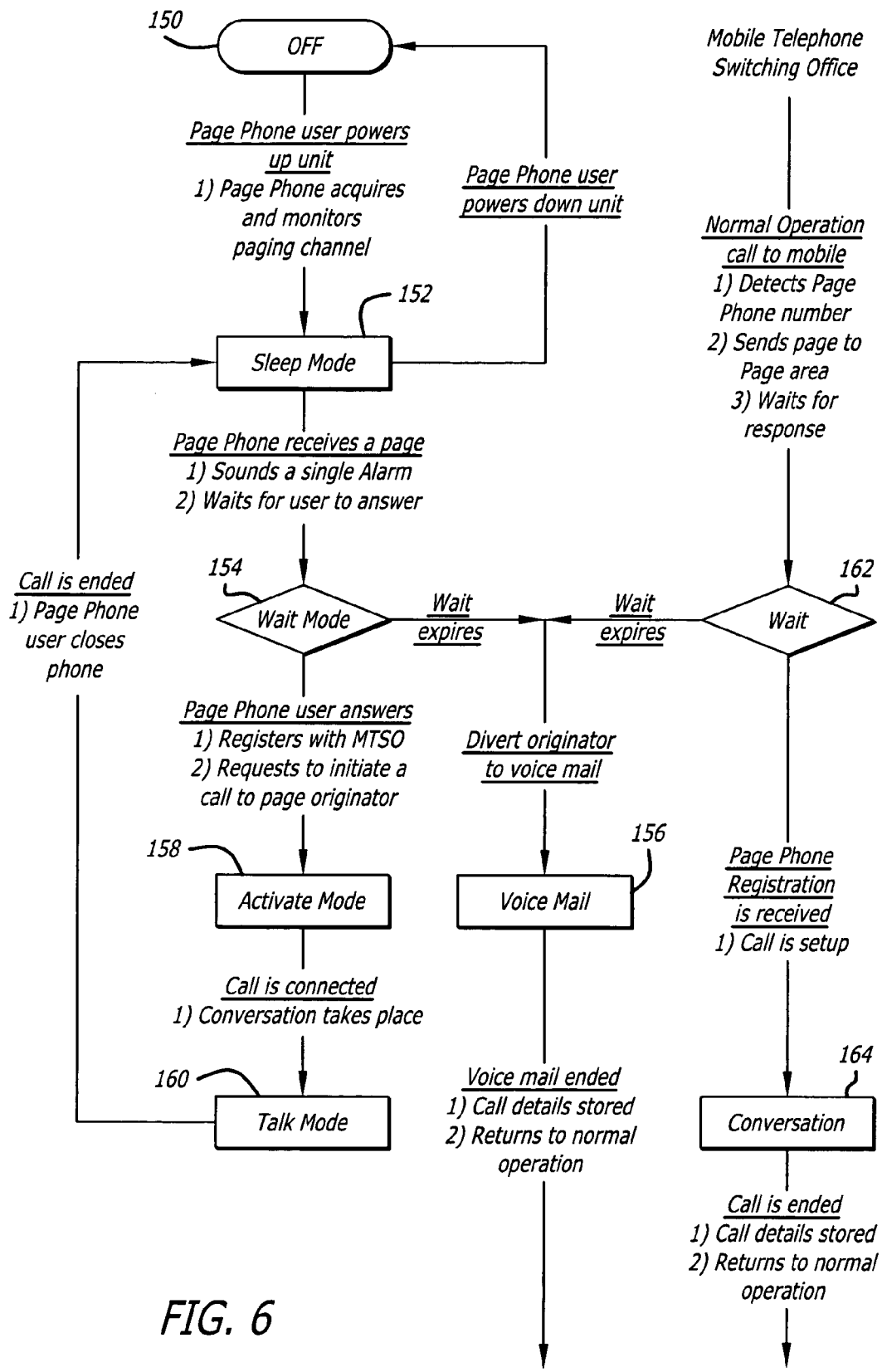
FIG. 6 is flow chart showing a first preferred method for a caller only initiated two-way wireless communication with caller generated billing in accordance with the present invention.

A flow chart showing a first preferred method for a caller only initiated two-way wireless communication with caller generated billing in accordance with the present invention is shown in FIG. 6. More specifically, this flow chart outlines the functioning for the pagephone apparatus in its prescribed system and network area. The initial function of the pagephone is virtually the same as a normal pager. In the Off state 150, no power is applied and the pagephone is unable to receive any kind of information. In order to utilize the pagephone, the pagephone subscriber powers up the unit to the Sleep Mode 152. In this mode, the pagephone acquires the paging channel timing and monitors the paging channel for incoming pages. Once the pagephone receives a page, from either a land or mobile caller, the subscriber is alerted to the page by either an audible sound or a vibration. The pagephone unit then enters the Wait Mode 154. The pagephone will then wait for a specified amount of time to allow the pagephone user or subscriber to answer the pagephone. This period will typically be a matter of seconds.

If the time period expires without an answer, the outside caller is diverted to the pagephone's voice mail system 156, which is later described in further detail with reference to FIG. 7. When the voice mail ends, the call details are stored and the pagephone returns to the Sleep Mode 152. Alternatively, if the pagephone is answered in the specified period of time, the pagephone enters the Active Mode 158. When the pagephone user answers the pagephone, it sends a registration message to the Mobile Telephone Switching Office (MTSO) in order to make its exact whereabouts known, and to request a call set up to the page originator. The page originator is preferably identified in the page message so that the pagephone user can determine whether or not they want to take the call. Once the MTSO connects the call, the pagephone enters the Talk Mode 160 during which a two way conversation takes place between the pagephone user and the call originator. Upon completion of the call, the pagephone returns to the Sleep Mode 152.

Turning now to the MTSO functions, the MTSO detects a pagephone number, sends the page to the pagephone, and then enters the Wait Period 162 to wait for a response. If a timely response is received, the MTSO sets up the call and the Conversation Mode 164 is entered. The MTSO then records and stores the call details. The caller initiating the call to the pagephone is then charged for the air time of the call.

Local pagephone calls will preferably be given priority on the paging channel in its area of coverage over normal pagers in order to ensure that pagephone calls are initiated with a page message within seconds of originating a call to the pagephone. The pagephone's Wait Mode 154 will typically range from three to five seconds. The Wait Period at the MTSO will be a similar range but will always be greater than that of the pagephone. Registration and call set up is expected to take approximately three to fifteen seconds depending upon the distance of the call and the time of day. In the event that the cellular system is loaded and the page cannot be issued instantly, the originator of the call to the pagephone will be diverted to voice mail. As an alternative to having the originating caller wait on line for the call to be connected, a "Call Back" feature may be implemented. This feature would provide the originator of the call with a message to hang up their phone and wait to be contacted. Once the pagephone receives the page and the call is connected, the originator's telephone would then call the pagephone back. This feature can be used during hours of peak load on the cellular system instead of diverting to voice mail. This feature could also be provided to the pagephone subscriber as an option provided by the service provider.

The main advantage of the pagephone system, method and apparatus of the present invention is that it is entirely passive and does not transmit any signals while in the Sleep Mode. Transmission is only initiated after a page message addressed to the pagephone is received and the pagephone user answers the pagephone. This transmission is to register the pagephone's existence with the MTSO and to set up the call. Therefore, the pagephone's location within the local area is unknown up to the point where it is contacted by an originating caller. This system and method will reduce the load on all other channels and prolong the life of the pagephone's battery.

Figure 7:
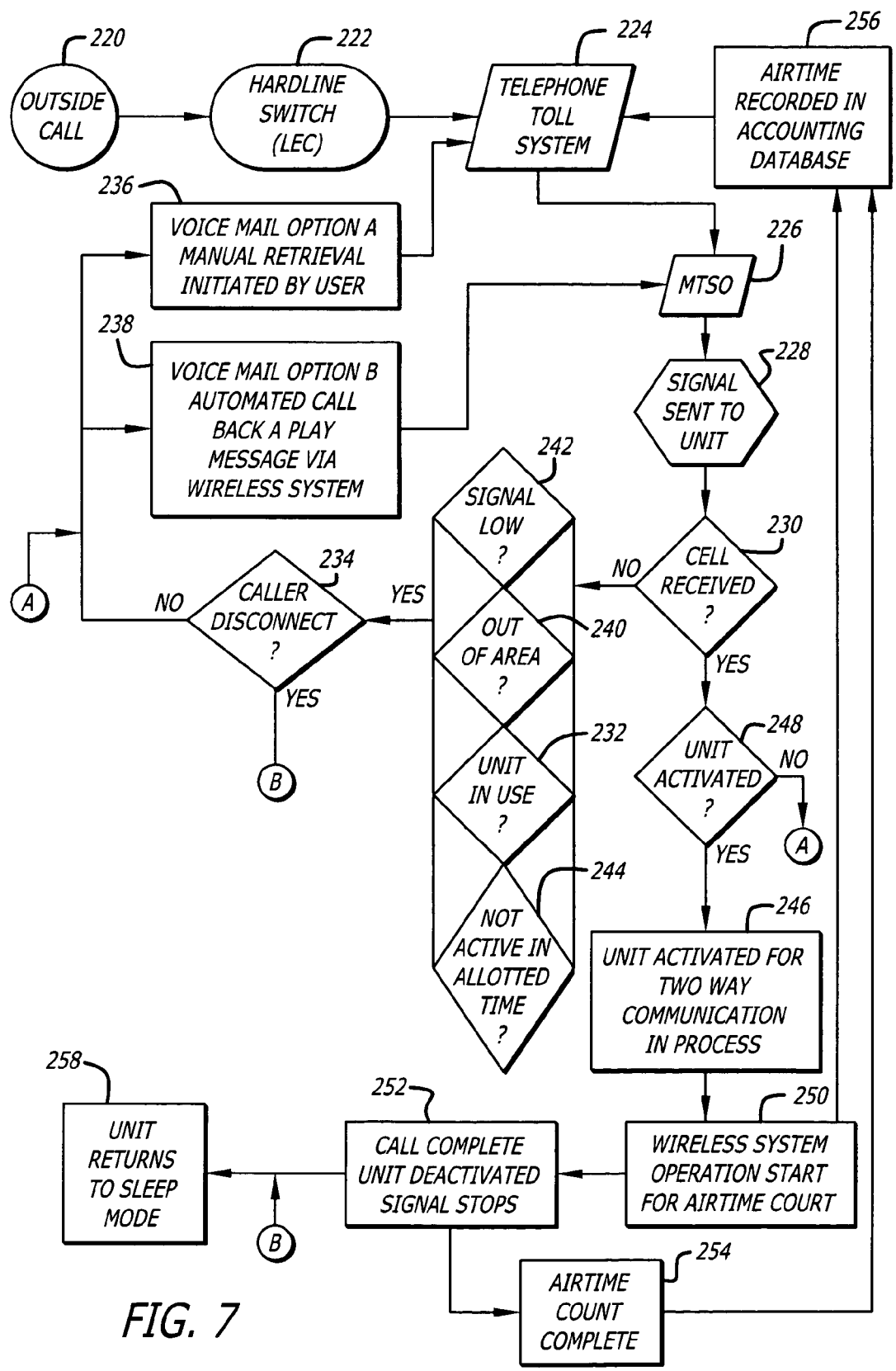
FIG. 7 is a flowchart showing a second, more detailed method for a caller only initiated two-way wireless communication with caller generated billing in accordance with the present invention.

FIG. 7 depicts a flowchart showing a second, more detailed method for a caller only initiated two-way wireless communication with caller generated billing in accordance with the present invention. Referring now to FIG. 7, an outside caller 220, either a PSTN caller or wireless caller, initiates a telephone call by calling a pagephone number. The call from the outside caller 220 is transmitted to a hardline switch or LEC 222 which is then transmitted to a telephone toll system 224. The call is then transmitted to the MTSO (wireless switch) 226 and the MTSO 226 sends a signal to a unit in step one 228.

The unit is preferably a radiotelephone transceiving apparatus in the form of a pagephone which comprises: 1) a housing with no keypad and no keypad circuitry so that the apparatus is a caller initiated only receiving apparatus for wireless two-way communication where no outgoing calls can be initiated by a user, 2) a receiving means for receiving radiotelephone signals contained within the housing, 3) transmission means for transmitting radiotelephone signals by the receiving means upon receipt of radiotelephone signals by the receiving means whereby the apparatus can only be used to supervise a two-way voice communication initiated from another telephone apparatus, 4) processing means coupled to the transmission means and receiving means for processing received signals and only transmitting radiotelephone signals in response to receipt of a signal having the correct mobile identification number of the transceiving apparatus whereby the processing means cannot create an outgoing address signal and can only produce an alert signal in response to a signal having the correct mobile identification number, and 5) means for indicating that radiotelephone signals coupled to the processing means are received.

In step two 230, the toll system 224 determines if the call was received by the unit. If the call was not received, the system 224 determines if the unit is in use 232. If the unit is in use, the system 224 has to determine if the caller has disconnected 234. The caller may be able to leave a voice mail message for the user. Two options exist for the voice mail—the voice mail can either be manually retrieved by the user of the unit 236 or the voice mail can automatically call back and play a message via the wireless system 238. With respect to the manual voice mail retrieval option, a pagephone subscriber may either access a telephone and call their page number to receive messages or, alternatively, the subscriber may manually push a "play" button on the pagephone which will play back voice mail messages that are recorded directly into the pagephone via a miniature recording system.

If the unit is not in use, the system 224 determines if the unit is out of the service area 240. If the system 224 is out of the service area, the system 224 returns to determine whether the caller has disconnected 234. If the unit is in the service area 240 the system 224 determines if the signal received by the unit is too low for transmission 242. If the signal received by the unit is too low for transmission 242, the system 224 returns to determine whether the caller has disconnected 234. If the signal received by the unit is not too low for transmission, the system 224 determines if the unit responds to the incoming signal within a predetermined time 244. If the unit does not respond to the incoming signal within the predetermined time 244, then the system 224 returns to determine whether the caller has disconnected 234.

If the unit responds to the incoming signal then the unit is activated for two-way communication between the caller and the unit subscriber 246. If the call was received by the unit and not activated 248 then the caller 220 can leave a voice mail message for the unit 236,238. If the unit is activated 248 and normal two-way communication proceeds 246, the toll system begins to count air time 250. When the call is completed the unit is deactivated 252 and the air time count is stopped 254. The total air time is calculated and recorded and billed to the outside caller's initiating telephone number 256. The unit then returns to the sleep mode 258.

The foregoing has described a simplified two way wireless communication system wherein the calling party initiates the call and pays for the call. The system does not allow for transmitting outgoing calls and only allows for receiving incoming calls thereby reducing fraud and creating a method for use by employers and parents alike that allows for controlling costs of two-way wireless communication.

Figure 8:
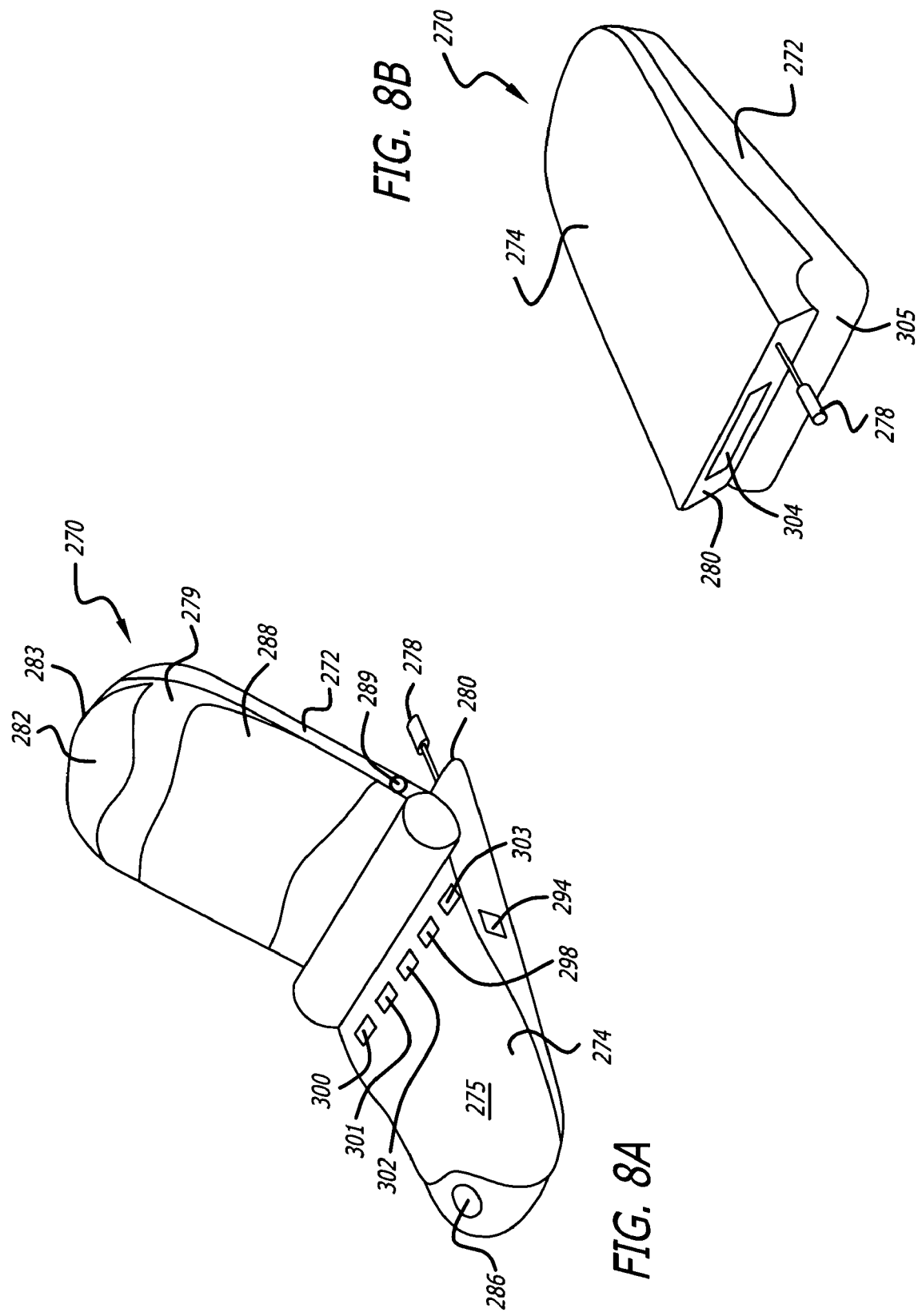
FIG. 8A is an open perspective view of one exemplary embodiment of a call receiving pager apparatus of the present invention having call back request features.
FIG. 8B is a closed perspective view of the preferred embodiment of the caller only initiated two-way communication apparatus of the present invention having call back request features shown in FIG. 8A.

Turning now to FIG. 8A, there is shown a first exemplary embodiment of the call receiving pager apparatus 270 of the present invention having call back request features. The apparatus 270 comprises a body 272 and a rotatably coupled flip element 274. The body 272 and flip element 274 are preferably comprised of a hard plastic or other suitable material. The body 272 may be any desired size but in a preferred version is approximately four inches in height, two inches in width, and one inch in thickness. The flip element 274 is preferably three and one-half inches in length and one and one-half inches in width. The body 272 includes an internal face portion 279, having no keypad or other call producing elements thereon, which lies in continuous adjacent communication with an internal surface 275 of the flip element 274. The flip element 274 has a microphone 276 affixed therein.

The flip element 274 includes an antenna 278, which may be contained internally in a known manner or may extend outwardly from a top side 280 of the apparatus 270, and a speaker 282 disposed in the body 272. The speaker 282 is located near the top side 283, and affixed to an interior portion of, the internal face 279 of the body 272. A switching means for switching the apparatus from a sleep state to an awake state comprising a push button 286 or any other known means is positioned so that the flip element 274 opens and closes the switching means upon opening and closing the flip element 274. That is, when the flip element 274 engages internal face portion 279, the apparatus 270 will be in the activated state, ready to receive a call and conduct two-way communication, as described more fully below. Alternatively, a switching means for receiving an incoming call may be positioned anywhere else on the pager where its activation is dependent upon manually depressing the push button or manually sliding a switch.

A detachable, rechargeable battery pack 288 may be slideably coupled within the internal face portion 279 of the body 272 for providing power to the electronic circuitry of the apparatus 270. This internal positioning of the battery pack 288 results in a more streamlined apparatus which protects the battery pack from being inadvertently knocked off or disconnected from the body 272. An optional light emitting diode (L.E.D.) may be located on the back side (not shown) of the body 272 or on the internal face portion 279. The L.E.D. is used to indicate when the output of the battery 286 drops below a desired level.

A connection jack 289 may also be contained within the body 272 of the apparatus 270 to allow for the connection of a keyboard or other information inputting device. The keyboard or information inputting device (not shown) enables the input of a pre-determined call back number and message from a user whereby the user can later select an activation switch or button associated with the pre-determined call back number and the pre-determined call back number will be transmitted. The recipient of the pre-determined call back number will then hear a message requesting the recipient to call the user at the user's pager number. This addition to the apparatus 270 still substantially limits the user's ability to use the apparatus 270 for two-way wireless communication. The user cannot initiate unlimited two-way communication but instead can only send a message requesting a call back.

Control of inputting the pre-determined information via an inputting device (not shown) may be at the point of sale of the apparatus 270. Alternatively, the purchaser of the apparatus 270 may control the information input into the device by keeping the inputting device separate from the apparatus 270 and exerting control over the inputting device.

The flip element 274 contains switches, push buttons, or touch pads for the ON/OFF function 300, a tone/vibrator function 301, an emergency call back numbers function 302, a predetermined call back number function 298, a record function 294, and a call waiting/voice mail play back function 303. The record switch pad 294 allows a subscriber to pre-record a message for later transmission to a predetermined telephone number in order to relay a request for the receiver to call back the subscriber to the apparatus 270 of the present invention. The apparatus 270 also includes call back request features in the form of a predetermined call back number switch pad 298 and an emergency call back number switch pad 302. The predetermined call back number may comprise either a home or office telephone number. An ON/OFF switch pad for the apparatus 270 is also included. Alternatively, the call back number switch pad 298, the emergency call back number switch 302 and the ON/OFF switch pad for the apparatus 270 may all constitute one switch pad which activates the different features according to the number of depressions of the switch pad. Also, in order to avoid accidental activation, the emergency call back number switch pad 302 may be set apart from, and away from, the predetermined call back number switch pad 298 and the ON/OFF switch pad 300.

Actuation of switch pads 298 or 300 causes operation of the apparatus 270 to transmit a predetermined call back number or an emergency call back number, respectively, to a mobile telephone switching office (MTSO) to effectuate telephonic communication with a fixed site of a telephonic network associated with the respective call sequence.

FIG. 8B shows a closed perspective view of the call receiving pager apparatus shown in FIG. 8A. In the closed position, a liquid crystal display 304 is located within the top side 280 of the flip element 274. This allows the user or subscriber of the call receiving pager apparatus to view the text or numerical numbers which may have been left by a caller. The flip element 274 is folded shut against the body 272 of the call receiving pager apparatus such that the battery pack 288 is contained and protected within the closed call receiving pager apparatus 270. The rotatable element 305 which secures the flip element 274 to the body 272 can be clearly seen.

Figure 9:
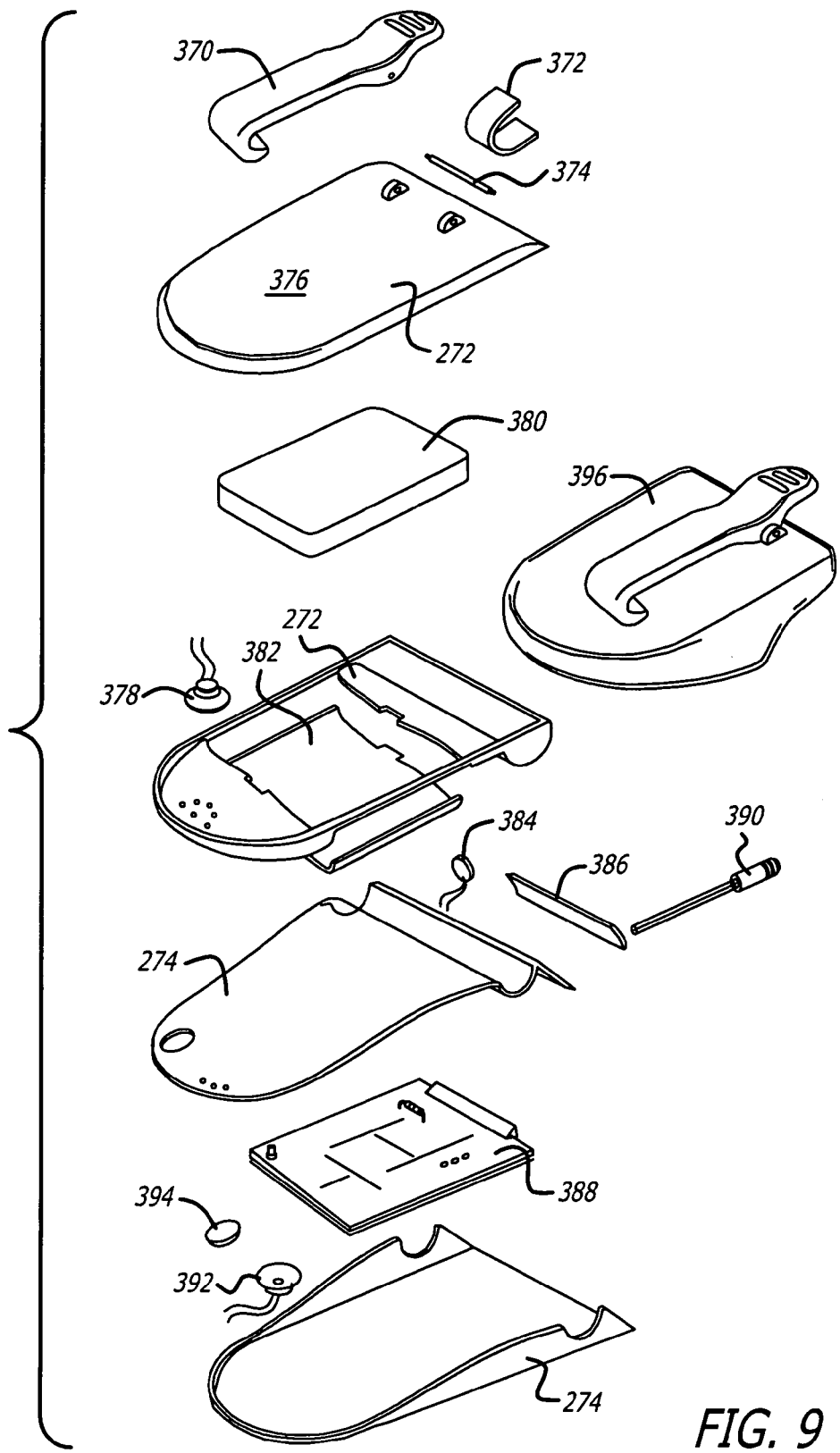
FIG. 9 is an exploded view of the exemplary embodiment of the call receiving pager apparatus of the present invention having call back request features shown in FIGS. 8A and 8B.

Turning now to FIG. 9, there is an exploded view of the exemplary embodiment of the call receiving pager apparatus 270 shown in FIGS. 8A and 8B. A clip 370, clip spring 372, and clip pin 374 are attached to the outer surface 376 of the body 274 of the call receiving pager apparatus 270. A speaker 378 and a lithium battery 380 are placed within the internal surface 279 of the body 272 of the apparatus 270. A battery cover 382 is used to cover and hold the lithium battery 380 in place. A power-on light 384 and an LCD cover 386 are placed on an outer surface of the flip element 274 so that they can be easily viewed by a user while a PC board 388, an antenna 390, and a microphone 392 are positioned within the flip element. A power button 394 is secured within the inner surface 275 of the flip element 274 to enable the unit to become activated upon opening of the flip element 274. Finally, a removable clip element 396 may be used in place of a clip element 370 that is secured to the outer surface 376 of the body 272 of the call receiving pager apparatus 270. The removable clip element 396 is designed to slide over a substantial portion of the body 272 such that the body 272 is seated within the removable clip element 396.

Figure 10:
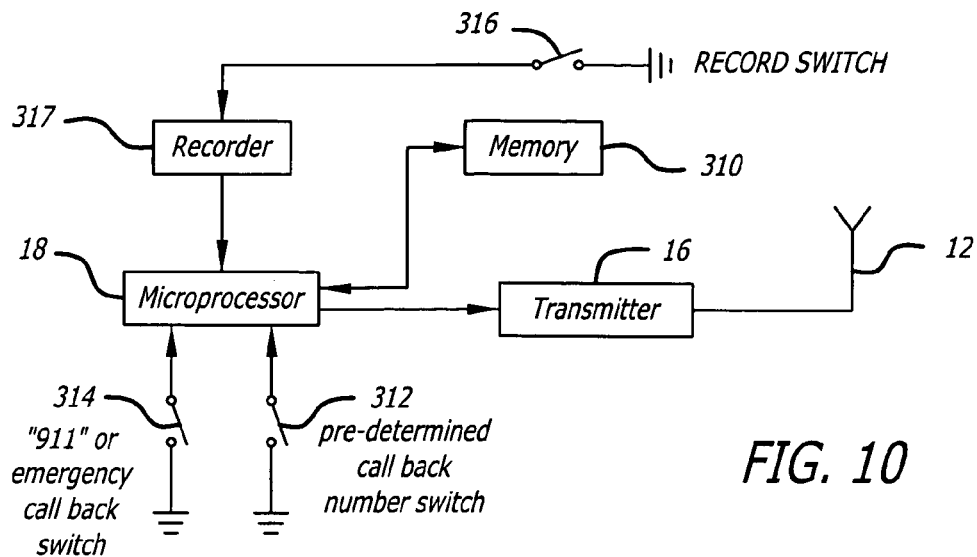
FIG. 10 is a block diagram of one example of the electronic circuitry for carrying out the call back request features of the call receiving pager apparatus of the present invention.

Turning now to the functions contained within, and capable of being carried out by, the call receiving pager apparatus 270, a block diagram of one example of the electronic circuitry for carrying out the call back request features of the apparatus 270 is shown in FIG. 10. A predetermined call back number, i.e. a home, office or business telephone number is entered and stored in a memory section 310 associated with microprocessor 18, which is the same microprocessor referred to in FIG. 1. This predetermined call back number will be the telephone number that is called when the predetermined call back number switch 312 is closed or activated. An emergency call back number such as "911" is also entered and stored in the memory section 310 of the microprocessor 18. The emergency call back number will be called when the emergency call back number switch 314 is closed or activated. When either the predetermined call back number switch 312 or the emergency call back number switch 314 are activated, the memory section 310 of the microprocessor 18 is accessed to obtain the stored telephone number associated with the respective switch. The retrieved telephone number is then sent to the transmitter 16, which is the same transmitter referred to in FIG. 1, so that the signal can be transmitted to the MTSO and the connection can be made between the apparatus 270 and the communication device associated with the transmitted telephone number.

A record switch 316 is connected to a recorder 317 for recording a message from the subscriber which is transmitted to the microprocessor 18 and stored in the memory section 310. The pre-recorded message contains the subscriber's name and pager number along with a request to call the subscriber's pager number in order to initiate two-way wireless communication with the subscriber. The pre-recorded message may also include an additional brief statement from the subscriber. It should also be understood by those skilled in the art that the pre-recorded voice message may instead take the form of a data message.

Upon transmission of and connection with a predetermined or emergency call back number, the memory 210 of the microprocessor 18 is accessed to retrieve the subscriber's pre-recorded voice or data message and the pre-recorded voice or data message is sent to the transmitter 16 for transmission to the predetermined or emergency call back number. The subscriber can then activate the two-way wireless communication with the predetermined or emergency number upon receiving a signal from an outside caller calling from one of those numbers by flipping the flip element 274 of the apparatus 270 to an open position.

Figure 11:
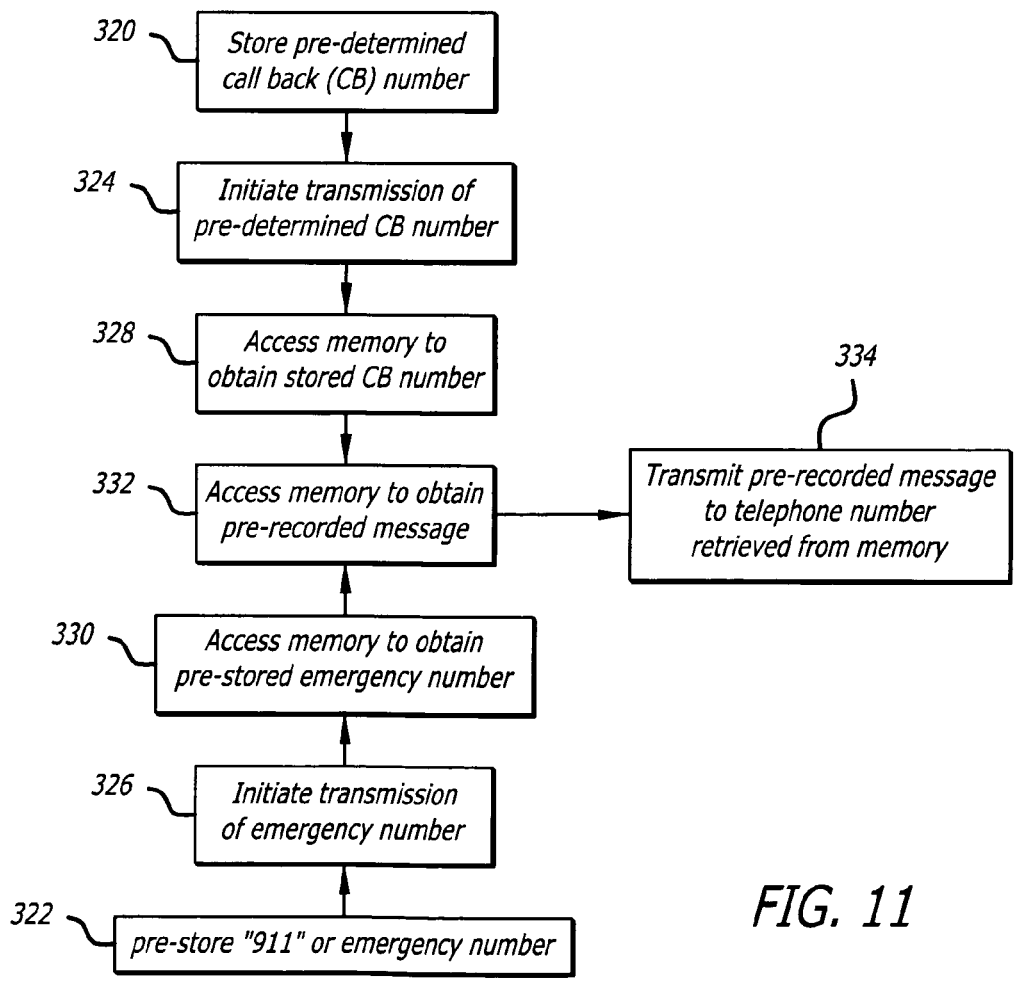
FIG. 11 is a flow diagram showing the method steps for carrying out the call back request features of one exemplary embodiment of the caller only initiated two-way communication system.

FIG. 11 depicts a flow diagram showing the method steps for carrying out the call back request features of the caller only initiated two-way communication system. First, as indicated in blocks 320 and 322, a predetermined call back number and an emergency number are entered and stored, respectively, in separate sections of the memory 310 of the microprocessor 18. Next, in blocks 324 and 326 initiation of the transmission of the predetermined call back number or emergency number by way of the predetermined call back switch 312 or emergency call back switch 314, respectively, results in accessing the memory section 310 of the microprocessor 18 to retrieve the stored telephone numbers associated with the switches 312 and 314 as shown in blocks 328 and 330. Then, as indicated by block 332, the memory section 310 of the microprocessor 18 is accessed to retrieve the pre-recorded voice or data message from the subscriber and the pre-recorded voice or data message from the subscriber is transmitted to the retrieved telephone number in block 334. The pre-recorded voice or data message may be retrieved from the memory section 16 of the microprocessor 18 either before or after the predetermined or emergency telephone number is transmitted and connection is made in order to transmit the pre-recorded voice or data message.

Figure 12:
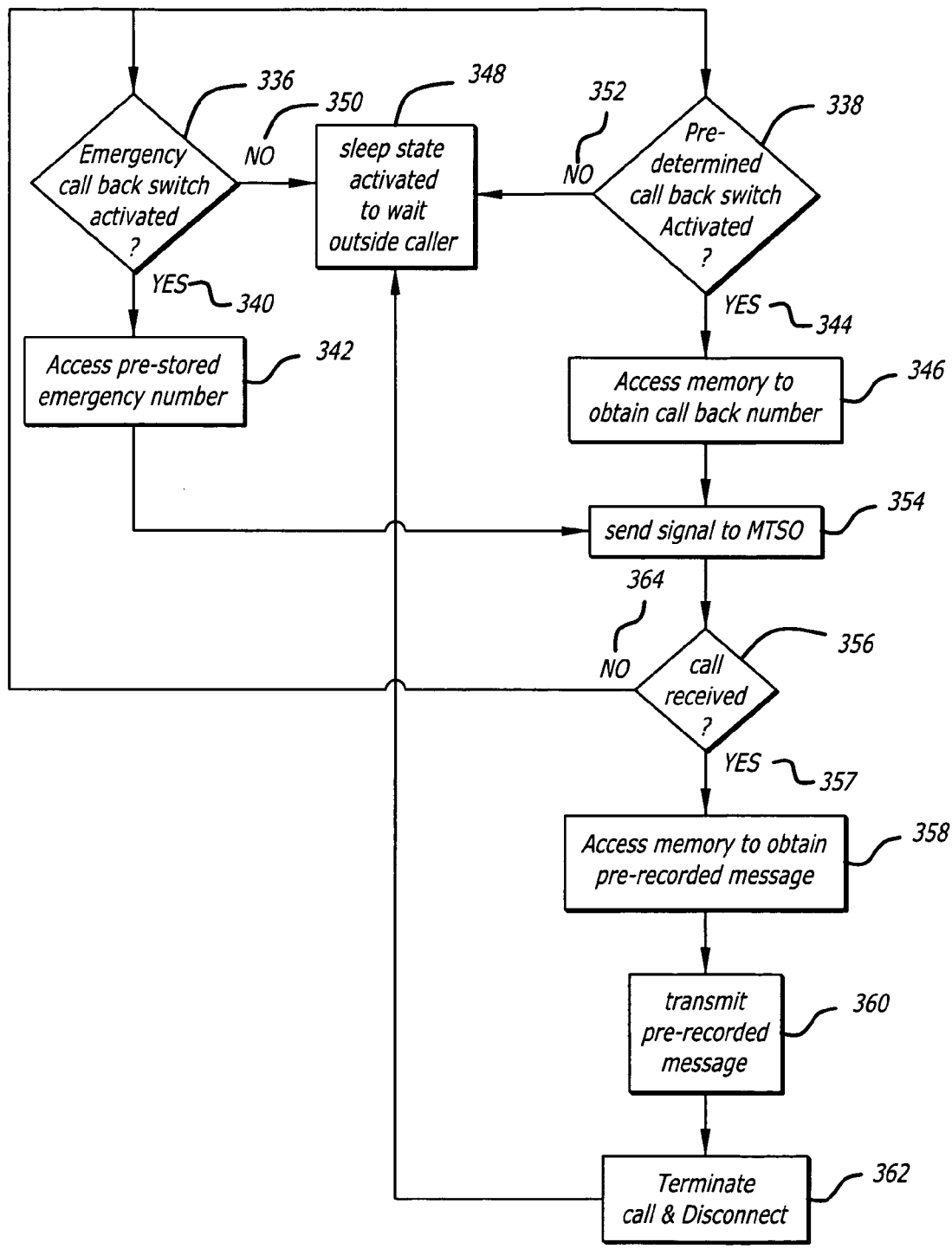
FIG. 12 is a flow chart showing a method for a call back request system used in association with one exemplary embodiment of the caller only initiated two-way communication system and apparatus of the present invention.

A flow chart showing the method for a call back request system used in association with the caller only initiated two-way communication system and apparatus is illustrated in FIG. 12. In step one, it is determined whether either the emergency call back number switch 336 is activated or the predetermined call back number switch 338 is activated. If the emergency call back number switch 336 is activated 340 then the pre-stored emergency telephone number is accessed 342 in step two or, if the predetermined call back number switch 338 is activated 344 then the predetermined call back number is obtained from the microprocessor memory 346 in step two.

As can be seen from the flow diagram depicted in FIG. 12, anyone of the emergency call back number switch 336, the predetermined call back number switch 338, or the sleep state 348 can be activated but only one of these functions may be carried out at a time. In other words, if the emergency call back number switch 336 is not activated 350, then either the predetermined call back number switch 338 may be activated 344 or the sleep state 348 may be activated to await an outside caller's page. If the predetermined call back number switch 338 is not activated 352, then either the emergency call back number switch 336 can be activated 340 or the sleep state 348 can be activated to await an outside caller's page. Finally, a subscriber may deactivate the sleep state 348 by activating either the emergency call back number switch 336 or the predetermined call back number switch 338.

In step three 354, a signal is sent to the MTSO with the signal being dependent upon which telephone number was retrieved in step two above. A connection is made between the apparatus 270 and either the communication apparatus (e.g. telephone) associated with the emergency call back number or the communication apparatus (e.g. telephone) associated with the predetermined call back number. A determination is made in step four 356 as to whether the connection has been made between one of the two pre-stored telephone numbers and the apparatus 270. If the connection is made 357, the memory section of the microprocessor is accessed in step five 358 to obtain and retrieve the subscriber's pre-recorded voice or data message. The subscriber's pre-recorded voice or data message is then transmitted to either the emergency call back number or predetermined call back number in step six 360. Once the prerecorded message is transmitted, the call is terminated and disconnected in step seven 362. The system then returns to sleep state 348 to await an outside caller's return call in response to the subscriber's pre-recorded voice or data message.

If the connection between the apparatus 270 and the predetermined call back number or the emergency call back number is not made 364, either the emergency call back number switch 336 or predetermined call back number switch 338 can be activated or re-activated, or, the system may return to sleep state 348.

Figure 13:
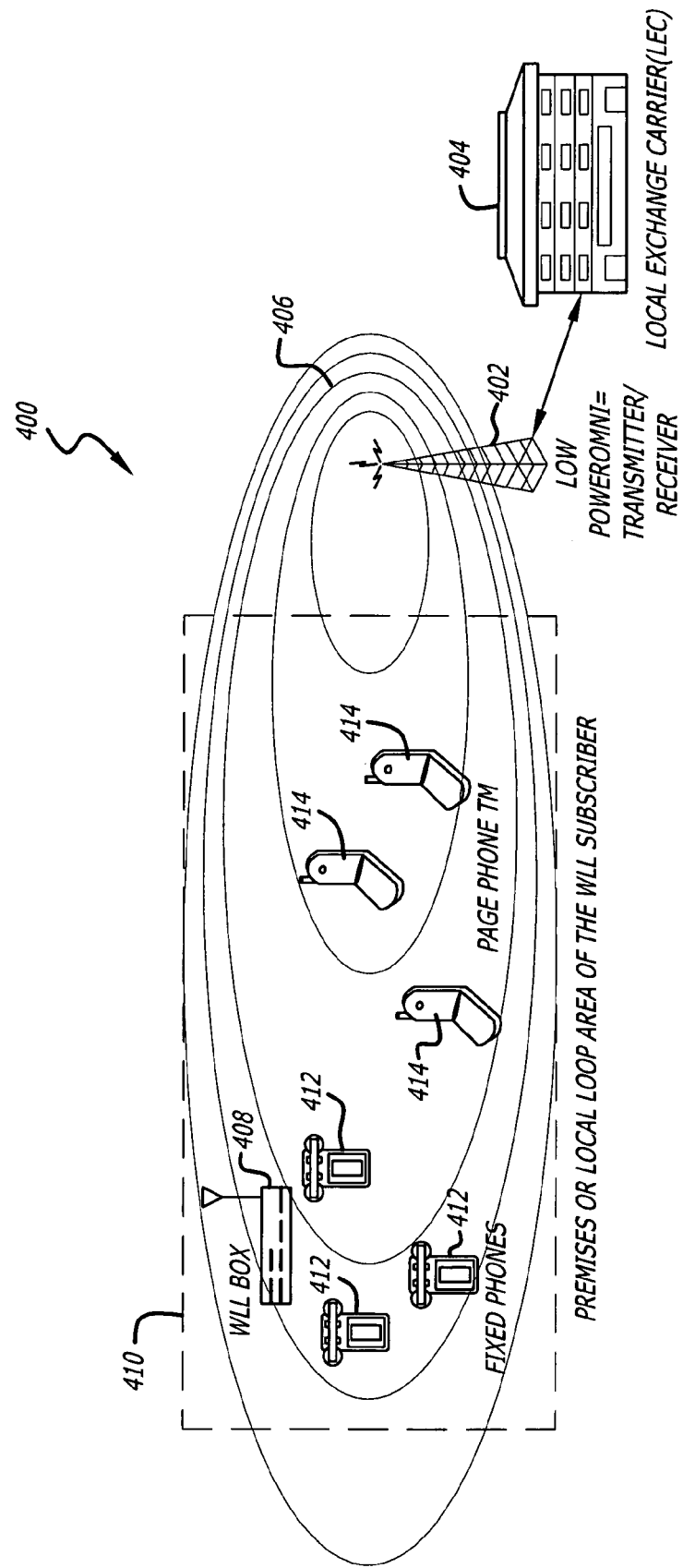
FIG. 13 is a schematic showing a wireless local loop communication system utilizing the pagephone/call receiving pager apparatus of the present invention.

FIG. 13 shows a wireless local loop system 400 which utilizes the pagephone/call receiving pager apparatus of the present invention. Low power omnidirectional radio frequency transmitter/receivers 402 are used which allow local exchange carriers 404 to provide loops 406 up to T1 (24) capacity to each wireless local loop subscriber.

Existing wireless local loops typically require the wireless local loop subscriber to install a transmitter/receiver box 408 on the premises or within the local loop area 410. Phone cable is then run from the transmitter/receiver box 408 to fixed land line telephones 412. In contrast, when pagephones or call receiving pager apparatus 414 of the present invention are utilized in a wireless local loop system 400, no such transmitter/receiver box 408 is required.

In a wireless local loop system 400, each pagephone or call receiving pager apparatus 414 operates on a dedicated frequency within the wireless local loop subscriber's premises or local loop area 410 and communicates directly with the telephone company's wireless local loop transmitter/receiver 402. It will be understood by those skilled in the art that the pagephones or call receiving pager apparatus 414 may co-exist with the local loop transmitter/receiver box 408 and fixed land line telephones 412.

The pagephones or call receiving pager apparatus 414 of the present invention may also utilize a dual mode transmitter/receiver to allow for automatic roaming from the premises or local loop area 410 to a regular cellular system. The wireless local loop 400 and cellular frequencies are preferably close in spectrum, e.g., wireless local loop 900 MHz and cellular frequency 800 MHz, for simplicity of design. The pagephone or call receiving pager apparatus 414 will monitor radio frequency (RF) power levels to determine movement from one system to another and initiate automatic de-registration and registration to the new system. Automatic de-registration and registration will not occur during a call when moving from one system to another because the two systems are distinct. The wireless local loop will always take precedence over cellular systems when the wireless local loop frequency is detected above a predefined power level.

Figure 14:
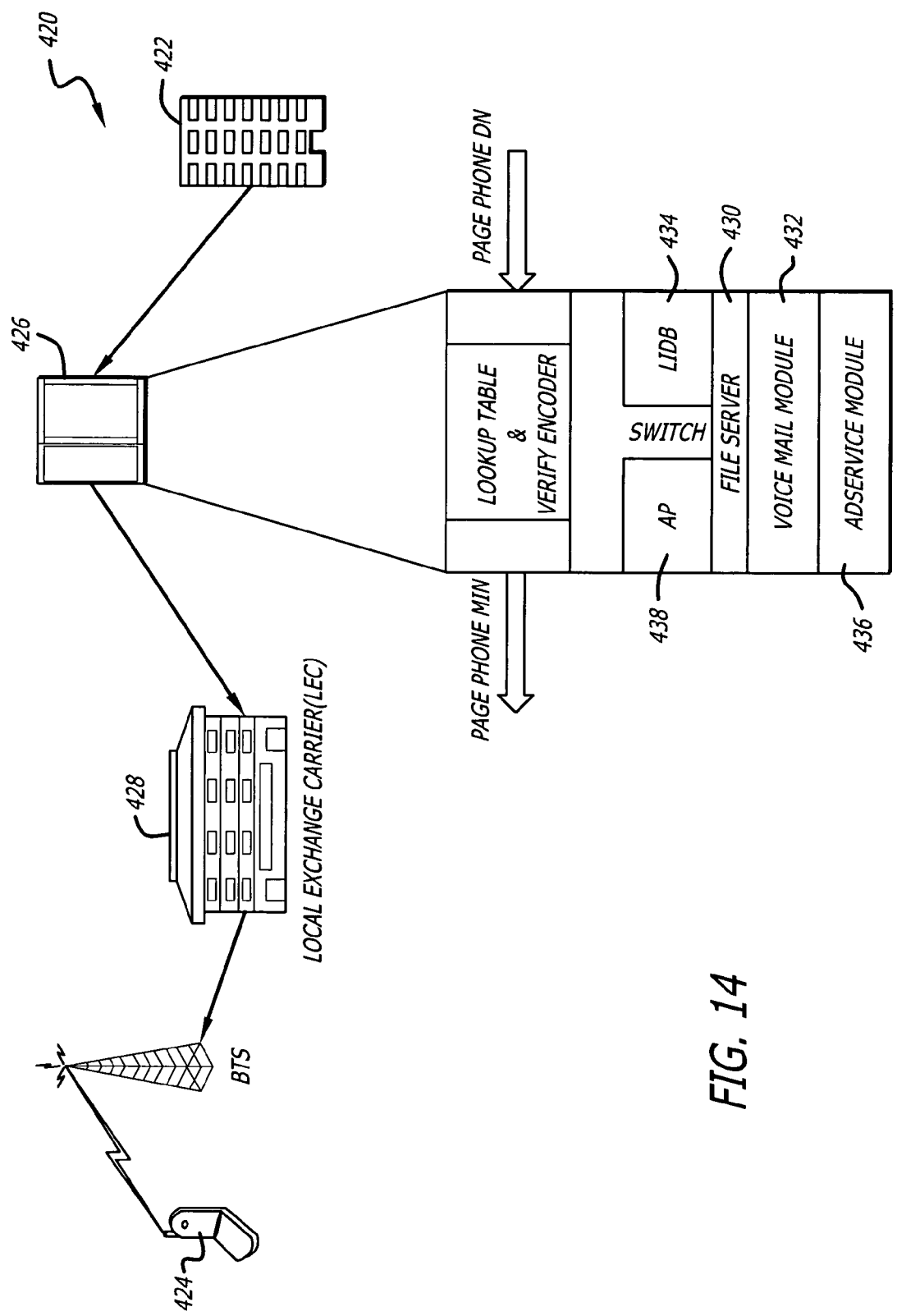
FIG. 14 is a schematic depicting a call receiving pager system of the present invention that establishes instant two-way wireless communication between a local exchange carrier and a call receiving pager apparatus of the present invention utilizing a dedicated switch.

Turning now to FIG. 14, a schematic depicting a call receiver paging system 420 of the present invention is shown that establishes instant two-way wireless communication between a caller through their local exchange carrier 422 and a call receiving pager apparatus 424 utilizing a dedicated switch 426. The call receiving pager system 420 utilizes dedicated switch 426 to provide proprietary access, billing functions and enhanced features including, but not limited to, calling party pays billing, selective drop in messaging, voicemail service and verification encoding.

The dedicated switch 426 provides call receiving pager apparatus 424 connectivity routed from land servicing local exchange carrier 422 to wireless service mobile telephone switching office 428. Dedicated switch 426 maintains three separate numbers for call receiving pager apparatus 424—a directory inbound dialing number (DID) to be used by callers calling the call receiving pager apparatus 424, a mobile identification number (MIN) recognized only by mobile telephone switching station (MTSO) 428, and a verification encoding signal (VES) sent by dedicated switch 426 and recognized only by call receiving pager apparatus 424.

Dedicated switch 426 is directly networked together with a file server (FS) 430, a voicemail unit (VMU) 432, a line information database (LIDB) duplicator 434, an interactive voice response unit (IVRU) 436, and an applications processor administrative front end (AP) 438. The FS 430 maintains several databases including, but not limited to, customer profiles, messaging profiles, MIN/VES/VMU lookup tables and call receiving pager apparatus service information. The IVRU 436 stores several digital audio messages including, but not limited to, calling party pays (CPP) reverse billing messages, customer status messages (CSM), and airtime discounted service messages (ADS). The VMU 432 provides personalized message storage for the pagephone caller which can only be retrieved by the call receiving pager apparatus subscriber. The VMU 432 will automatically connect to the caller when the call receiving pager apparatus subscriber does not answer the call or page or when the caller specifically chooses to enter the voice mail option.

The LIDB duplicator 434 stores information about the calling party and their local exchange carrier billing company. This database creates a record of first time callers by validation, over telephone circuits, on the nationwide LIDB network utilizing DTMF, SS7, ISDN and all future intelligent networks. The system will only revalidate the record of a repeat caller every thirty days to maintain system efficiency. The AP 438 provides the customer(subscriber) service interface to the switching system over a wide area network (WAN). The customer service department performs various provisioning tasks that include, but are not limited to, the initial DID/MIN/VES setup of the call receiving pager apparatus customers with expiration information, the demographic profile of the call receiving pager apparatus customers, the demographic profiles of the ADS advertisers and the audio file downloading of the various IVRU 436 messages.

The present invention also contemplates the use of the above described dedicated switch in all types of cellular communications including, but not limited to, standard wireless cellular telephones and standard pagers.

Figure 15:
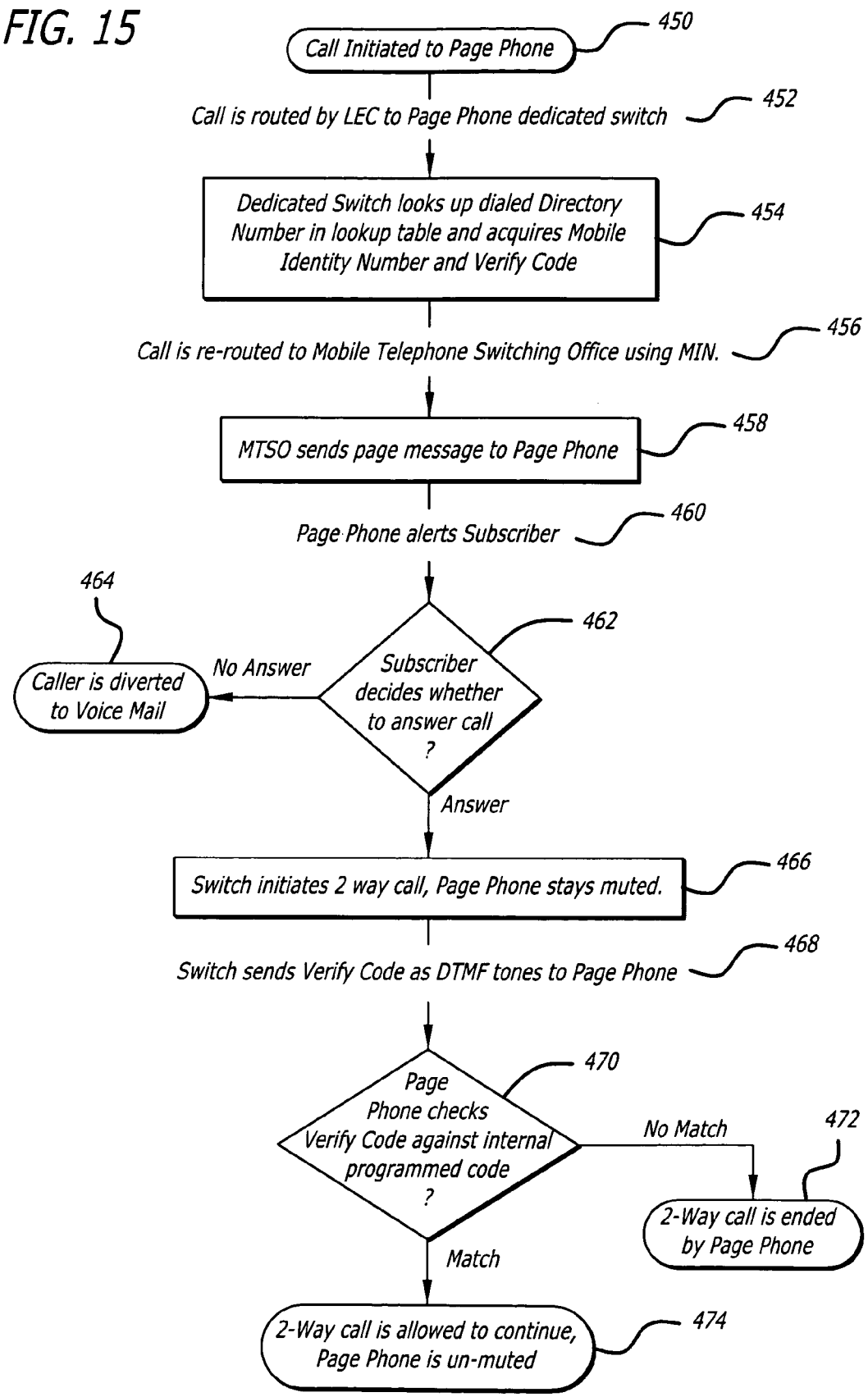
FIG. 15 is a flowchart showing one exemplary method of the present for generating direct two-way communication between a caller and a subscriber of a call receiving pager apparatus of the present invention utilizing a dedicated switch.

FIG. 15 shows a flowchart of one exemplary method of the present invention for generating direct two-way communication between a caller and a subscriber of a call receiving pager apparatus of the present invention utilizing a dedicated switch. A call is initiated 450 to the call receiving pager apparatus and is then routed 452 by the local exchange carrier to the call receiving pager apparatus dedicated switch. The dedicated switch looks up 454 the dialed directory number in a lookup table to determine its associated mobile identification number and verification code. Next, the call is re-routed 456 to the MTSO using the mobile identification number. The MTSO then sends 458 the page message to the call receiving pager apparatus and the call receiving pager apparatus alerts 460 the call receiving pager apparatus subscriber that they are receiving a page or call. The subscriber then decides 462 whether or not to answer the call.

If the subscriber does not answer the call, the caller is diverted 464 to voice mail. If the subscriber does answer the call, the dedicated switch initiates 466 direct two-way communication between the caller and the subscriber but the call receiving pager apparatus stays muted. The dedicated switch then sends 468 the associated verification code as DTMF tones to the call receiving pager apparatus. The call receiving pager apparatus then verifies 470 the code against a code that is internally preprogrammed into the call receiving pager apparatus. If the codes do not match, the direct two-way communication between the caller and the subscriber is terminated 472 before unmuting the call receiving pager apparatus. Alternatively, if the codes do match, the direct two way communication between the caller and the subscriber is allowed to proceed by unmuting 474 the call receiving pager apparatus.

Figure 16A:
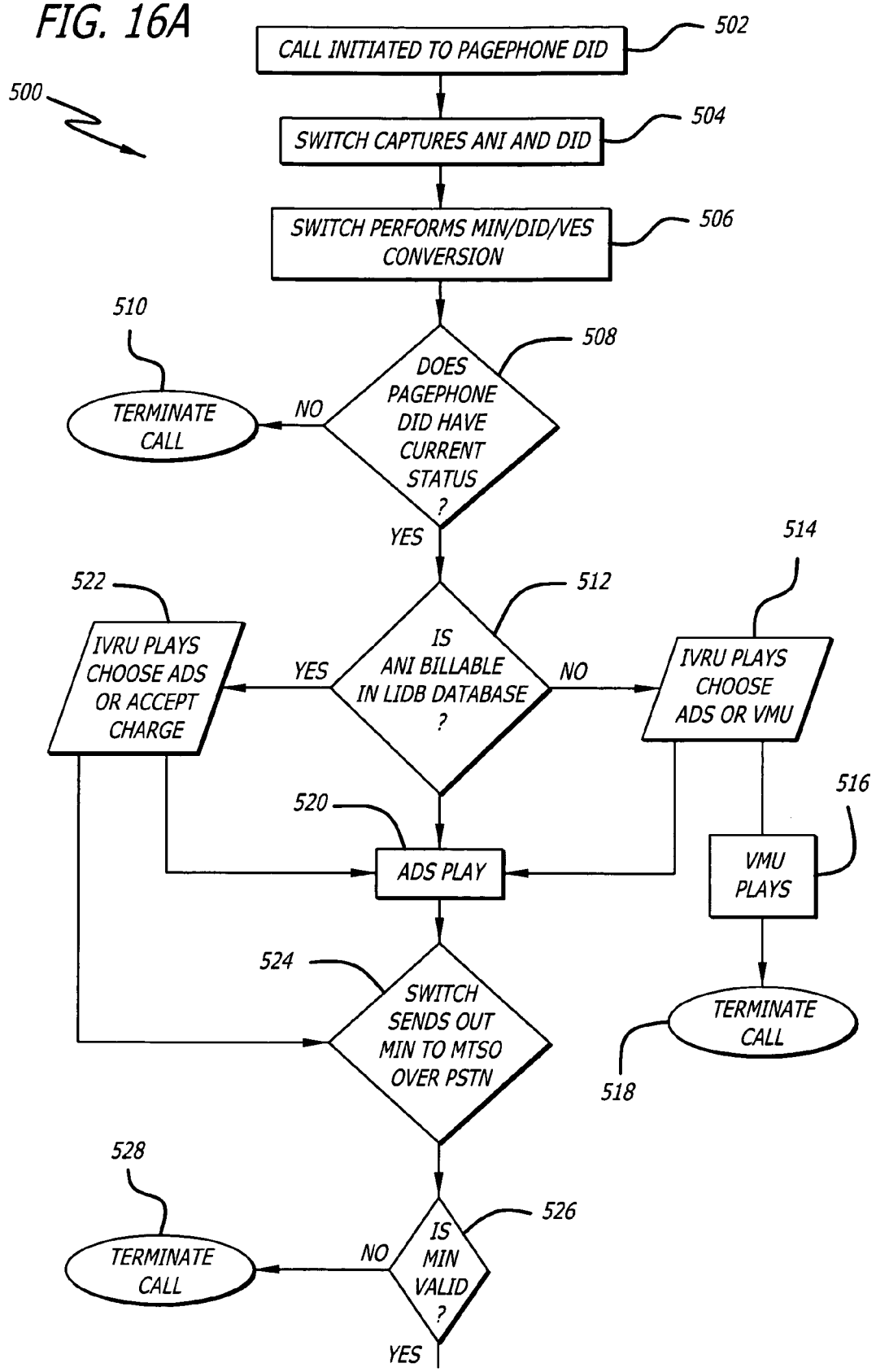
FIGS. 16A and 16B show a flowchart of another exemplary method of the present invention for generating direct two-way communication between a caller and a subscriber of a call receiving pager apparatus of the present invention utilizing, a dedicated switch.
Figure 16B:
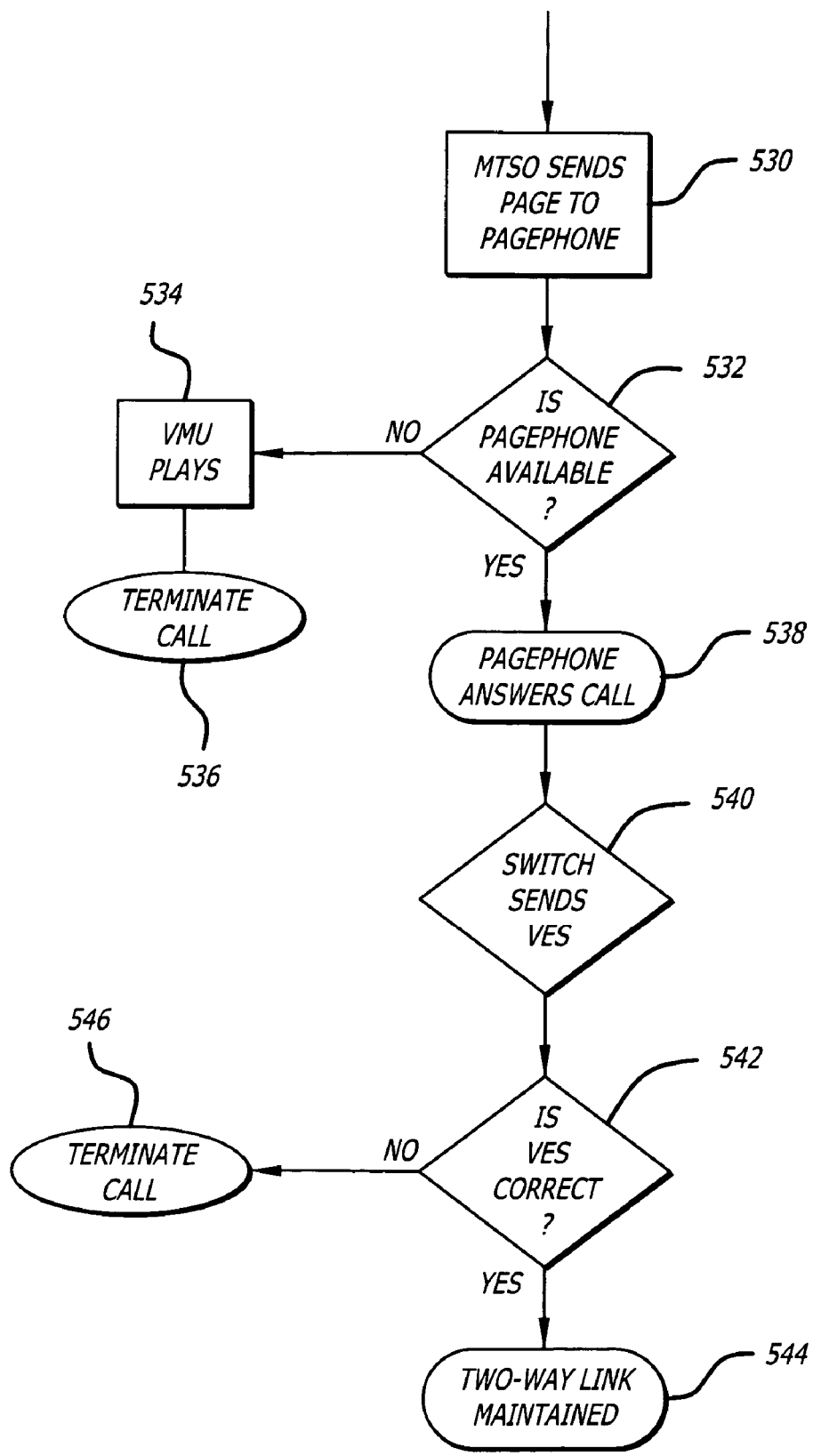

Turning now to FIGS. 16A and 16B, a flowchart is depicted showing another exemplary method 500 of the present invention for generating direct two-way communication between a caller and a call receiving pager apparatus subscriber utilizing a dedicated switch. First, in step one 502, a call is initiated to the pagephone's DID. The dedicated switch then captures the automatic number identification (ANI) of the calling party and the subscriber's DID in step two 504. In step three 506, the dedicated switch performs MIN/DID/VES conversion and in step four 508, a determination is made as to whether or not the pagephone has current status. If the pagephone does not have current status, the call is terminated in step five 510. However, if the pagephone does have current status, a determination is made in step six 512 as to whether the AIN is billable in the LIDB database. If the ANI is not billable (i.e. ANI is a payphone or hotel phone), the IVRU will play a message to the caller in step six 514 indicating that the caller has a choice to either hear airtime discount service (ADS) advertisements or be connected directly to the VMU. If the caller request to be connected to the VMU, the VMU plays in step seven 516 and the call is then terminated in step eight 518. If the caller elects to hear the ADS advertisements, the ADS advertisements are played in step nine 520.

On the other hand, if the AIN is billable (i.e. AIN is a home or office phone), the IVRU will play a message to the caller in step ten 522 to indicating that the caller has a choice to either accept the per minute toll charge and have it directly billed to their local telephone bill or hear the ADS advertisements. If the caller elects to hear the ADS advertisements, the ADS advertisements are played in step nine 520 and the dedicated switch then sends out the MIN to the MTSO over the PSTN in step eleven 524 after the ADS advertisements are played. However, if the caller elects to accept the toll charge, the dedicated switch immediately sends out the MIN to the MTSO over the PSTN as in step eleven 524.

Once the MIN is sent to the MTSO, the MTSO determines if the MIN is valid in step twelve 526. If the MIN is not valid, the call is terminated in step thirteen 528. However, if the MIN is valid, the MTSO sends a page to the pagephone in step fourteen 530. A determination is made in step fifteen 532 as to whether the pagephone is available. If the pagephone is not available, the VMU plays in step sixteen 534 and the call is terminated in step seventeen 536 after the VMU is played. Alternatively, if the pagephone is available, the subscriber answers the call in step eighteen 538.

The dedicated switch then sends the verification code (VES) to the pagephone in step nineteen 540. If the VES is determined in step twenty 542 to be correct, two way direct communication is enabled between the caller and the subscriber in step twenty-one 544. However, if the VES is determined to be incorrect in step twenty 542, the call is terminated in step twenty-two 546.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

We claim:

1. A wireless local loop system, comprising:
 a local exchange carrier;
 a low power omnidirectional radio frequency transceiver communication with said local exchange carrier, thereby facilitating a local exchange carrier's establishment of a local loop over an area via said low power omnidirectional radio frequency transceiver;
 at least one pagephone having a mobile identification number associated therewith, a dual mode transceiver providing automatic roaming capability from said local loop to a regular cellular system, and a radio frequency power level monitor;
 wherein said radio frequency power level monitor determines movement of said at least one pagephone between said local loop and the regular cellular system, and initiate de-registration and registration of said at least one pagephone from one of said local loop or said regular cellular system to one of said local loop or said regular cellular system; and
 an apparatus configured to receive and process said mobile identification number such that a wireless connection can be made between a telephone apparatus initiating a call to said at least one pagephone, thereby allowing two-way communication to be established between said telephone apparatus initiating said call with said at least one pagephone.

2. The system of claim 1, wherein said radio frequency power level monitor is adapted to provide a deference of registration of said at least one pagephone with said local loop from said regular cellular system when a detected power level of a radio frequency signal having a frequency associated with said local loop is detected above a predefined power level.

3. The system of claim 1, wherein said local loop is adapted to provide up to T1 capacity to a wireless local loop subscriber.

4. The system of claim 1, wherein said at least one pagephone is adapted operate on a dedicated frequency within a wireless local loop subscriber's premises or said area.

5. The system of claim 1, wherein said local loop and said regular cellular system are adapted to utilize frequencies that are close in spectrum.

6. The system of claim 1, wherein said local loop and said regular cellular system are adapted to utilize operational frequencies within about 100 MHz of each other.

7. The system of claim 1, further comprising a database configured to charge at least a portion of said call to an account associated with the telephone apparatus that initiated the call.

8. The system of claim 1, further comprising a customer profile that is adapted to reduce at least a portion of communication charges at least partially in response to receipt of one or more advertisements.

9. The system of claim 1, further comprising a database profile configured to reverse communication charges from a subscriber to a calling party.

10. The system of claim 1, further comprising a database profile configured to split communication charges between a subscriber and a calling party.

11. A wireless local loop apparatus, comprising:
a radio frequency transceiver configured to communicate with:
(i) a local exchange carrier, thereby facilitating a local exchange carrier's establishment of a local loop over an area via said radio frequency transceiver; and
(ii) at least one wireless communication apparatus having an associated mobile identification number, a multimode transceiver providing automatic roaming capability from said local loop to a regular cellular system, and a radio frequency power level monitor;
wherein the radio frequency power level monitor determines movement of said at least one wireless communication apparatus between said local loop and the regular cellular system, and to initiate de-registration and registration of said at least one wireless communication apparatus from one of said local loop or said regular cellular system to one of said local loop or said regular cellular system; and
wherein the wireless local loop apparatus receive and process said associated mobile identification number such that a wireless connection is made between a telephone apparatus initiating a call to said at least one wireless communication apparatus, thereby allowing two-way communication to be established between said telephone apparatus initiating the call with said at least one wireless communication apparatus.

12. The apparatus of claim 11, wherein said radio frequency power level monitor is configured to provide a deference of registration of said at least one wireless communication apparatus with said local loop from said regular cellular system when a detected power level of a radio frequency signal having a frequency associated with said local loop is detected above a predefined power level.

13. The apparatus of claim 11, wherein the at least one wireless communication apparatus is configured to process an associated identification number of at least one of a calling party and a subscriber.

14. The apparatus of claim 13, wherein the subscriber is one of at least the regular cellular system and the local loop.

15. The apparatus of claim 13, wherein:
the associated identification number of at least one of the calling party and the subscriber comprises a carrier identification number; and
the local exchange carrier is configured to provide wideband capability to the subscriber.

16. The apparatus of claim 13, wherein:
the associated identification number of the calling party and the subscriber is selected from the group that consists of: a local phone number, a DID (Directory Inbound Dialing Number), a carrier identification number, and a Mobile Identification Number (MIN); and
the local exchange carrier is adapted to communicate over a wideband area network.

17. The apparatus of claim 11, wherein the at least one wireless communication apparatus is adapted to operate on a dedicated frequency within the local loop.

18. The apparatus of claim 11, further comprising an account associated with a calling party initiating the call to charge at least a portion of charges associated with the call.

19. The apparatus of claim 11, wherein the mobile identification number of the at least one wireless communication apparatus comprises a Directory Inbound Dialing (DID) number.

20. The apparatus of claim 11, wherein the local loop and the regular cellular system utilize frequencies that are substantially close in a chosen frequency spectrum.

21. The apparatus of claim 13, wherein the associated identification number of at least one of the calling party and the subscriber comprises a Mobile Identification Number (MIN).

22. The apparatus of claim 11, wherein a calling party is provided an option of receiving one or more advertisements to reduce communication charges.

23. The apparatus of claim 11, wherein an option is provided of receiving an advertisement to reduce communication charges.

24. The apparatus of claim 11, wherein at least one of the regular cellular service, the at least one wireless communication apparatus, and the local loop comprises a billing option of receiving one or more promotional messages to reduce communication charges.

25. The apparatus of claim 11, wherein the at least one wireless communication apparatus has an associated system profile that comprises at least one communication charging payment option of reducing or reversing communication charges.

26. The apparatus of claim 11, further comprising a database configured to reduce at least a portion of communication charges partially responsive to receiving one or more advertisements.

27. The apparatus of claim 11, further comprising a customer profile adapted to reverse communication charges from a subscriber to a calling party.

28. The apparatus of claim 11, further comprising a billing profile adapted to split communication charges between a subscriber and a calling party.

29. The apparatus of claim 11, wherein a database associated with the at least one wireless communication apparatus credits billing in response to received advertisement to reduce communication charges of at least one of a calling party and a subscriber.

30. A wireless local loop system, comprising:
means for communicating with a local exchange carrier, thereby facilitating a local exchange carrier's capability to establish a local loop over an area;
means for at least one wireless communication device communicating with the local loop;
wherein said at least wireless communication apparatus has a mobile identification number associated therewith, a dual mode transceiver providing automatic roaming capability from said local loop to a regular cellular system, and a radio frequency power level monitor;
wherein the radio frequency power level monitor determines movement of said at least one wireless communication apparatus between said local loop and said regular cellular system, and to initiate de-registration and registration of said at least one wireless communication apparatus from one of said local loop or said regular cellular system to one of said local loop or said regular cellular system; and means for receiving and processing said mobile identification number such that a wireless connection is made between a telephone apparatus initiating a call to said at least one wireless communication apparatus, thereby allowing two-way communication to be established between said telephone apparatus initiating the call and said at least one wireless communication apparatus.

31. The system of claim 30, wherein said radio frequency power level monitor is configured to provide a deference of registration of said at least one wireless communication apparatus with said local loop from said regular cellular system when a detected power level of a radio frequency signal having a frequency associated with said local loop is detected above a predefined power level.

32. The system of claim 30, further comprising means for reducing at least a portion of communication charges in response to receiving one or more advertisements.

33. The system of claim 30, further comprising means for directing and re-directing communication charges from at least one of a subscriber to a calling party or from a calling party to a subscriber at least partially responsive to acceptance or declination of discount airtime offers or promotions.

34. A wireless communication apparatus, comprising:
electronic circuitry adapted to communicate with a wireless local loop apparatus having a radio frequency transceiver, the radio frequency transceiver communicates with a local exchange carrier, thereby to facilitate a local exchange carrier's capability to establish a local loop over an area via said radio frequency transceiver; and wherein the electronic circuitry comprises an associated mobile identification number, a multi-mode transceiver providing automatic roaming capability from said local loop to a regular cellular system, and a radio frequency power level monitor;

wherein the radio frequency power level monitor determines movement of the wireless communication apparatus between said local loop and the regular cellular system, and to initiate de-registration and registration of said wireless communication apparatus from one of said local loop or said regular cellular system to one of said local loop or said regular cellular system; and wherein the wireless local loop apparatus receive and process said associated mobile identification number such that a wireless connection is made between a telephone apparatus initiating a call to said wireless communication apparatus, thereby allowing two-way communication to be established between said telephone apparatus initiating the call with said wireless communication apparatus.

35. The apparatus of claim 34, wherein said radio frequency power level monitor is adapted to provide a deference of registration of said at least one wireless communication apparatus with said local loop from said regular cellular system when a detected power level of a radio frequency signal having a frequency associated with said local loop is detected above a predefined power level.

36. The apparatus of claim 34, wherein the wireless communication apparatus is configured to process an associated identification number of at least one of a calling party and a subscriber.

37. The apparatus of claim 36, wherein the subscriber is one of at least the regular cellular system and the local loop.

38. The apparatus of claim 36, wherein:
the associated identification number of at least one of the calling party and the subscriber comprises a carrier identification number; and
the local exchange carrier provides wideband capability to the subscriber.

39. The apparatus of claim 36, wherein:
the associated identification number of the calling party and the subscriber is selected from the group that consists of a local phone number, a DID (Directory Inbound Dialing Number), a carrier identification number, and a Mobile Identification Number (MIN); and
the local exchange carrier is configured to communicate over a wideband area network.

40. The apparatus of claim 34, wherein the at least one wireless communication apparatus is configured to operate on a dedicated frequency within the local loop.

41. The apparatus of claim 34, further comprising an account associated with a calling party initiating the call to charge at least a portion of charges associated with the call.

42. The apparatus of claim 34, wherein the Mobile Identification Number of the wireless communication apparatus comprises a Directory Inbound Dialing (DID) number.

43. The apparatus of claim 34, wherein the local loop and the regular cellular system are adapted to utilize frequencies that are substantially close in a chosen frequency spectrum.

44. The apparatus of claim 36, wherein the associated identification number of at least one of the calling party and the subscriber comprises a Mobile Identification Number (MIN).

45. The apparatus of claim 34, wherein a calling party is provided an option of receiving one or more advertisements to reduce communication charges.

46. The apparatus of claim 34, wherein an option is provided of receiving an advertisement to reduce communication charges.

47. The apparatus of claim 34, wherein at least one of the regular cellular service, the wireless communication apparatus, and the local loop comprises a billing profile to receive one or more promotional messages in exchange of reduced communication charges.

48. The apparatus of claim 34, wherein the at least one wireless communication apparatus has an associated system profile that comprises at least one communication charging payment option of reduced or reversed communication charges.

49. The apparatus of claim 34, further comprising a database adapted to reduce at least a portion of communication charges partially in response to receipt of one or more advertisements.

50. The apparatus of claim 34, further comprising a database profile configured to reverse communication charges from a subscriber to a calling party.

51. The apparatus of claim 34, further comprising a billing profile adapted to split communication charges between a subscriber and a calling party.

52. The apparatus of claim 34, wherein a database associated with the wireless communication apparatus credits billing in response to received advertisement to reduce communication charges of at least one of a calling party and a subscriber.

* * * * *